United States Patent [19]
King

[11] Patent Number: 6,148,293
[45] Date of Patent: *Nov. 14, 2000

[54] METHOD AND APPARATUS OF CREATING A FINANCIAL INSTRUMENT AND ADMINISTERING AN ADJUSTABLE RATE LOAN SYSTEM

[76] Inventor: Douglas L. King, 6604 Covehollow Rd., Oklahoma City, Okla. 73123

[ * ] Notice: This patent is subject to a terminal disclaimer.

[21] Appl. No.: 08/953,572

[22] Filed: Oct. 17, 1997

Related U.S. Application Data

[63] Continuation of application No. 08/374,017, Jan. 18, 1995, Pat. No. 5,742,775.

[51] Int. Cl.[7] ................................. G06F 17/60
[52] U.S. Cl. ............................. 705/35; 705/38
[58] Field of Search ................ 235/379; 705/1, 705/30, 35, 36, 38

[56] References Cited

U.S. PATENT DOCUMENTS

| | | | |
|---|---|---|---|
| 3,634,669 | 1/1972 | Soumas et al. | 705/4 |
| 4,194,242 | 3/1980 | Robbins | 705/38 |
| 4,232,367 | 11/1980 | Youden et al. | 705/38 |
| 4,633,397 | 12/1986 | Macco | 705/30 |
| 4,642,767 | 2/1987 | Lerner | 705/30 |
| 4,648,038 | 3/1987 | Roberts et al. | 705/38 |
| 4,706,539 | 11/1987 | Bagheri | 84/284 |
| 4,736,294 | 4/1988 | Gill et al. | 705/38 |
| 4,742,457 | 5/1988 | Leon et al. | 705/35 |
| 4,752,877 | 6/1988 | Roberts et al. | 705/35 |
| 4,766,539 | 8/1988 | Fox | 705/4 |
| 4,839,804 | 6/1989 | Roberts et al. | 705/36 |
| 4,876,648 | 10/1989 | Lloyd | 705/38 |
| 4,989,141 | 1/1991 | Lyons et al. | 705/36 |
| 5,025,138 | 6/1991 | Cuervo | 705/38 |
| 5,083,270 | 1/1992 | Gross et al. | 705/35 |
| 5,101,353 | 3/1992 | Lupien et al. | 705/37 |
| 5,136,501 | 8/1992 | Silverman et al. | 705/37 |
| 5,136,502 | 8/1992 | Remrtel et al. | 705/2 |
| 5,148,365 | 9/1992 | Dembo | 705/36 |
| 5,193,056 | 3/1993 | Boes | 705/36 |
| 5,201,398 | 4/1993 | Clugston | 198/396 |
| 5,206,803 | 4/1993 | Vitagliano et al. | 705/39 |
| 5,210,687 | 5/1993 | Wolfberg et al. | 705/36 |
| 5,237,500 | 8/1993 | Perg et al. | 705/35 |
| 5,291,398 | 3/1994 | Hagan | 705/4 |
| 5,384,260 | 1/1995 | Osborne et al. | 436/64 |
| 5,704,045 | 12/1997 | King et al. | 705/35 |
| 5,742,775 | 4/1998 | King | 705/38 |
| 5,878,404 | 3/1999 | Stout, Jr. et al. | 705/38 |

FOREIGN PATENT DOCUMENTS

| | | |
|---|---|---|
| 2054956 | 11/1991 | Canada . |
| 4136320A1 | 4/1991 | Germany . |
| 11-85848 | 3/1999 | Japan . |

OTHER PUBLICATIONS

Mills, S.J., "Project Finance for Alternative Energy," *Renewable Energy*, p. 207–208, (1993) XP–002089408.

*Primary Examiner*—Edward R. Cosimano
*Attorney, Agent, or Firm*—Carella, Byrne, et al.; John N. Bain; William Squire

[57] ABSTRACT

An operatively interconnected data processing and computing system is provided for creating, servicing and paying loan agreements between a lender and borrower providing for repayment of the loan together with interest at a periodically adjusted rate based on the terms of the agreement. The system includes data processing for a novel form of relationship management links, supervising and balancing the interests of contractholders, marketing agents, financial intermediaries, investment managers, investment bankers, custodians, rating agencies and an issuing entity.

118 Claims, 25 Drawing Sheets

METHOD AND APPARATUS OF CREATING A FINANCIAL INSTRUMENT AND ADMINISTERING AN ADJUSTABLE RATE LOAN SYSTEM

This application is a continuation of application Ser. No. 081374,017 filed Jan. 18, 1995 now U.S. Pat. No. 5,742,775.

TECHNICAL FIELD

This invention relates to financial management systems and, more specifically, to data processing methodology for effecting an improved adjustable rate loan structure for financial institutions.

A portion of the disclosure of this patent document contains material which is subject to copyright protection. The owner has no objection to the facsimile reproduction by anyone of the patent disclosure, as it appears in the Patent and Trademark Office patent files or records, but otherwise reserves all copyright rights whatsoever.

DESCRIPTION OF THE PRIOR ART

A number of financial management systems have been proposed in the past. Exemplary systems include U.S. Pat. Nos. 4,232,367, 4,633,397, 4,648,038, 4,742,457, 4,752,877, 4,766,539, 4,839,804, 4,876,648, 5,083,270, 5,101,353, 5,148,365, 5,210,687, and 5,237,500. However, such prior systems address substantially different problems and accordingly, are significantly different from the adjustable rate loan system of the present invention.

There exist a variety of formats under which money is transferred from one party to another. Two primary considerations in these transactions are: i) if, when, and how will the money be returned; and ii) the compensation for the use of the funds. The transferring party must also consider its ability to sell, mortgage or assign its position in the instrument acquired.

Common Equity—Purchasing common equity shares in a corporation places the transferring party in a position of ownership, but not necessarily control. Money transferred is not likely to be returned, unless the corporation is liquidated or the parties agree to allow the corporation to repurchase the shares. The compensation for use of the funds is the transferring party's proportionate share of the net value of the company and any dividends. As to the transferring party's ability to sell, assign or mortgage the shares; if the company is publicly traded, this will be less difficult than if it is privately held.

The transferring party is subject to the risk of a total loss of investment. In a privately held company, the transferring party is exposed to such risks that would cause the value of the company to diminish. Such party must generally be prepared to accept these risks for a long period as the shares are not easily marketable.

To create share liquidity, improve market values and attract new shareholders, companies often go public. If the company is publicly traded, additional market risk is present as the value of shares may be influenced by market sentiment or other factors which do not affect the underlying performance or book value of the company. Thus to reduce the long-term risk of holding an equity position, the transferring party assumes market value risk if the shares are publicly traded. The party may also receive additional compensation in the form of market gains on shares attributable to market sentiment, as opposed to the performance of the company.

For the corporation, common equity is often the most expensive source of funding when profits are substantial and the least expensive when marginal or sustaining losses.

Preference Equity—A preference equity position often provides an annual stated revenue stream, an option by the holder to convert to common shares, the ability of the corporation to redeem the shares, and a senior position in a liquidation. For the transferring party, the possibility of annual compensation is increased, but the holder remains subject to the risk of the performance of the corporation. For the company, this format may provide additional funding which may be subsequently reduced through share redemption. Payment of an annual preference dividend is generally out of net profits, so the corporation's commitment to pay often remains subject to profitability. Again, the transferring party continues to be subject to the risk of the company's underlying business performance on an annual basis.

Convertible Debt—For the transferring party, in addition to obtaining a priority claim over equity in the event of a liquidation, return of monies transferred (principal) compensated by an annual payment or accrual of fixed compensation (interest) may be reasonably assured. Since the rate of interest is generally below current market rates at the time of the original transaction, additional compensation is provided in the form of an option to convert to equity at a stated price. To the extent the value of the company's shares increase, the value of the option increases, thereby generating additional compensation.

This instrument has historically been viewed by some to be somewhat similar to preference equity, except carried as a debt instrument. For example, instead of being a $100 preference share, with a four (4%) percent annual dividend, convertible to a common share at $100, a convertible debt instrument might be a note with a $100 principal balance bearing four (4%) percent annual interest, convertible to one common share for $100.

For the transferring party, this instrument is tantamount to paying the company the difference between the interest rate received and the current rate which could otherwise be earned on an equivalent credit for the right to purchase common shares of the company in the future for a predetermined price.

For the company, this arrangement provides a lower annual fixed cost of money, however results in a dilution of value to other equity holders if the value of the company's shares subsequently increases and the convertible debt is exchanged for equity.

Fixed Rate Debt—This involves the transferring party ("lender") and the accepting party ("borrower") agreeing when the principal will be returned, the rate at which interest will accrue, and when it will be paid.

The lender's compensation is fixed and not determined on the basis of profitability of the enterprise, other than as it relates to the borrower's ability to meet its obligations. In a liquidation, the lender has a preferred position over equity, and will often have priority rights to certain assets and cashflows.

Lenders in accepting fixed rate debt instruments must anticipate the effects of inflation, changes in the credit quality of the borrower, variability of market interest rates and liquidity on the future cash flow characteristics and value of a loan. Traditionally, lenders compensate for these uncertainties in the interest rate charged on the loan. This rate includes what the lender feels may be the level of inflation during the term of the loan, compensation for credit and default risks, as well as liquidity risk.

For example, an investor purchasing a 30 year non-callable government bond priced to yield 7% is accepting a yield which represents the market's current assessment of reasonable compensation for a 30 year term, including compensation for future inflation. Since the obligation is of the highest credit quality and highly liquid, little if any additional "premium" is added to the interest rate. On the other hand, a government note maturing in 1 year, priced to yield 4%, suggests the short-term outlook for inflation is less than over a longer period of time.

An "A" rated 30 year non-callable corporate bond, might be priced to yield 8.5%. The additional 150 basis points (100 basis points equal 1%) over the interest rate of a comparable government obligation compensates the investor for increased credit risk and less liquidity (marketability). If the current inflation rate is 1.5%, the investor might consider the real rate of interest on an "A" rated 30 year non-callable corporate debt obligation is 2.5%, premium for future inflation representing 4.5%, with credit and liquidity premium at 1.5% for a total annual yield of 8.5%.

If interest rates on long-term government securities subsequently increased to 9%, "A" rated corporate obligations might be priced to yield 10.5%. At that point, the investor holding the original security, would not be adequately compensated for inflation, credit or liquidity risks on the basis of then current market indices. Conversely, if the long-term government securities rate dropped to 5%, with the "A" rated corporate rate at 6%, the investor would be overcompensated during such period. The investor may be required to recognize these changes for financial reporting purposes. An increase in interest rates may result in a loss on the carrying value of the security. A decrease in interest rates may result in a gain in market value, but some long-term fixed rate instruments are callable and thus a decrease in rates often results in early repayment by the borrower.

For borrowers, long term fixed rate callable debt obligations provide the opportunity to borrow at long term rates which might become inexpensive compared to the market if is rates rise, while allowing early repayment if rates fall. This type of loan is not very attractive to lenders. Unless the borrower is an excellent credit or the interest rate on the obligation is extremely high compared to the market, it is less likely the credit markets will accept callable long-term fixed rate debt from such a borrower. If the debt is non-callable the borrower risks the possibility of comparatively more expensive financing if rates fall.

Variable Rate Debt—The transferring party ("lender") and the accepting party ("borrower") agree when and the terms under which principal will be repaid, as well as an index to be used to determine the rate at which interest will periodically accrue, and when it will be paid. These instruments may be issued on a short-term or long-term basis.

One such long-term alternative mortgage instrument is the adjustable rate mortgage, or ARM, which allows for periodic adjustment of payments to compensate for what the lender feels will be the inflationary effect on the loan during the upcoming period. For example, a typical ARM is indexed to a standard interest rate such as a particular bank's prime rate or six-month Treasury bill average. These loans are generally prepayable by the borrower.

For the lender this type of loan is viewed as a shorter term loan due to prepayment histories. If rates are low, these loans can be attractive to lenders, in that if rates rise, compensation increases. Conversely, they are less attractive in a high rate environment, particularly if the lender believes rates will decline.

Other than ARMS, the variable rate instrument is generally not a long-term instrument and when it is, it has generally been callable on a periodic basis by the lender, as in the case of many single premium deferred annuities. These instruments often have a rate established each year by the insurer. If the holder ("lender") is not satisfied with the rate or is concerned about the credit quality of the insurer, they generally can redeem (call) the instrument and receive their funds, less a penalty.

The variable rate instrument usually compensates the lender for use of the funds on the basis of current market rates. For example, using a one year U.S. treasury rate of 4%, a short term loan to a highly rated credit might be 4.75%, representing a 75 basis point "premium" for credit and liquidity risks. Again, looking at a 30 year treasury bond yielding 7%, we see 300 basis points per annum of compensation to fix the rate for a long term. The lender accepts the lower rate today, which is the market's perception of appropriate compensation for the credit and inflation risks to which the lender is currently exposed. In renewing the loan, the lender can increase the rate based on new market conditions, but may also able to add an additional "premium" to compensate for any increased credit risk.

If the variable rate instrument is a non-callable long-term loan indexed to short term interest rates, it limits the lender's future reinvestment alternatives, and may not provide adequate compensation, in that the lender might be able to receive similar compensation for making shorter term loans. For the borrower, such a loan just assures availability of money in future years, leaving the borrower subject to varying cost of funds, which would generally be higher than the borrower simply accessing the short-term market.

Under the prior art, numerous debt and equity instruments, along with various derivative securities, have developed between parties transferring monies and those accepting it which have complicated the analysis of risk exposure and its appropriate compensation. For instance, some insurance companies have issued variable annuities which simply involved the payment of return on the basis of an underlying investment portfolio. These look more like equity in a mutual investment fund than a debt instrument paying interest. Other insurers have designed single premium deferred annuities or guaranteed investment contracts which pay a guaranteed rate of interest, along with an additional annual amount being a portion of their divisable surplus. It could be argued that the monies transferred should be bifurcated and viewed as a fixed rate debt instrument, and an equity share participating in a portion of the profits of the company. These instruments have often attempted to shift investment risk to the party transferring the funds. Often the structure of these instruments was driven by regulatory or tax considerations, attempting to shift investment risk to a "debt holder%". In some cases, they merely represent a means of transferring a portion of the lender's assets to a segregated account held by the borrower, to permit the lender to gain an accounting treatment advantage, booking the arrangement at cost rather than marking the assets to market.

Generally parties loaning money to an enterprise are compensated only through interest, except to the extent a capital gain is recognized on the sale of the instrument. This gain still emanates from the commitment of the borrower to pay interest at a predetermined rate in the future.

Debt holders are exposed to two primary risks: i) changes in interest rates during the life of the loan, and ii) the ability of the borrower to repay principal and interest.

It is imprudent to enter into a loan arrangement unless both borrower and lender are comfortable with the borrower's ability to repay. However, this risk can be affected by changes in interest rates and other terms of the loan.

Interest Rate Volatility—To properly assess the risks of a particular loan, the lender and borrower must consider the use of proceeds and cost of funds.

If the lender has a fixed cost of funds, then a fixed rate long-term loan matched to its underlying source of funds may permit it to profit from a spread between its cost of funds and the rate on the loan. Increases or decreases in market interest rates are of no consequence to the lender. Any deterioration in credit or prepayment of the loan, however, could expose the lender to risk in its ability to compensate its source of funds or to meet certain future payment objectives, as in the case of a defined benefit pension plan.

For the borrower, a long-term fixed rate source of funds may be appropriate if the use of these proceeds allows it to generate a cash flow stream which is more than sufficient to repay interest and principal on the loan. The arrangement provides the borrower protection against increased financing cost if rates increase while foregoing reduced costs if interest rates were to decrease. A risk the borrower assumes in a non-callable fixed rate financing is that the purpose for which the loan proceeds was used does not produce the desired revenue or terminates prior to the maturity of the loan. If the borrower's capital and other revenues are insufficient to pay interest and principal on the loan to maturity, then credit quality may deteriorate increasing the lender's risk. This risk can be reduced for the borrower by permitting early redemption of the loan. Often the lender will require a prepayment penalty, call premium, and/or an increased rate of interest throughout the financing term. This option then becomes more appropriate for a lender with a variable cost of funds.

Risk for a lender with a variable cost of funds, or who bases investment performance on current market rates of interest, can be managed and returns enhanced in a variety of ways.

A lender prepared to accept no significant risk in exchange for current market compensation will generally invest in short-term government securities. Its return may be enhanced in three ways: i) extending the term for which its funds are employed; ii) accepting increased credit risk, and iii) accepting fixed rate interest. These options increase the risk to which the lender is exposed, but also provide the possibility of increased return when viewed on an annual basis compared to interest paid on short-term government obligations.

For instance, a party transferring funds could purchase adjustable rate mortgages, whose interest rate is periodically reset off the short-term treasury rate. This increased compensation results from both the extended term for which the funds have been committed and the increased credit risk over short-term government obligations. Other variable rate and inflation-indexed debt obligations provide a means of transferring inflation and other exposures to a borrower. In effect, the market demands higher interest during periods of more inflation and economic uncertainty, causing variable rates to be reset higher to compensate investors.

Existing markets currently provide lenders a means of reducing inflation rate exposure through varying maturities of debt instruments they purchase. A lender could invest in long-term government obligations. Under some interest rate scenarios, the interest on long-term obligations is significantly more than that of short-term obligations. This increased compensation results from both the extended term for which the funds have been committed and accepting a fixed rate for the long-term government obligations. The lender might further increase potential compensation by accepting a corporate obligation, thereby adding credit risk to its mix of exposures. If rates increase, the carrying value of these instruments can substantially decrease and may result in lower investment earnings when compared to short-term government bonds. Of course, the converse may be true if interest rates decline. This risk may also be transferred through a fixed to floating rate interest swap contract or other form of derivative security. The cost, when combined with interest earned may be greater than current rates on short-term government obligations.

Liquidity is another method of protecting a lender from changes in inflation or interest rates, as well as economic uncertainty, by allowing a debt obligation to be sold. Specialized debt obligations, though, or those with deteriorating credit quality (which may result from the market's analysis of the impact of these changes on the obligor) may have limited liquidity and thus leave the lender exposed to these risks. Sometimes these risks may be transferred to an insurer through financial guarantee insurance. Generally this is available only for investment grade obligations, and is most often used for municipal government securities. Consequently, investors purchasing long-term corporate debt obligations must often bear the risk of deteriorating credit or liquidity, inflation and other risks without adequate compensation.

For users of funds, the optimum borrowing scenario may be that the characteristics of financial instruments issued by the borrowers match as closely as possible the characteristics of the objective being financed. When this involves fixed rate debt which may be prepaid, the cost of the financing increases and the availability of lender funds decreases.

In some instances, floating rate loans do not adequately match interest costs to revenue generated from the activity financed. In effect, interest cost becomes a variable to the borrowing enterprise. At certain levels, revenues may be insufficient to cover debt service. This can even create a spiral effect. For example, the borrower's cost of funds is tied to a variable market index. As interest rates rise, the borrower's cost of funds increases. If the financed activity does not produce additional revenues in an increasing rate environment, credit quality of the loan may deteriorate. In a traditional context, the lender would require an additional interest "premium" to compensate for increased credit risk. This begins a spiral effect of putting more pressure on revenues, potentially exacerbating deteriorating credit.

Since repayment terms and compensation, in the form of interest, are determined when a debt obligation is issued, numerous external factors can subsequently change the economics of the transaction for both parties.

The foregoing and other problems of the prior art are addressed by the present invention which addresses these problems for borrowers and lenders by providing a unique financial instrument and adjustable rate loan system designed to reduce exposures for both lenders and borrowers seeking a long term lending relationship.

SUMMARY OF THE INVENTION

The system of the present invention comprises a method of creating and administering a long-term financial instrument and adjustable rate loan program which reduces risks to both borrowers and lenders.

If a lender has funds which must be continually reinvested over a long period of time, its primary considerations are ultimate repayment and compensation for funds outstanding. The system administers a long-term lending relationship between a lender and a borrower which takes into account changes in market interest rates and the compensates or manages credit exposures, reducing transactional costs and increasing overall compensation to the lender.

The system provides borrowers (issuing entity) the ability to more closely match interest payments to revenues generated from financed activities, while accelerating the obligation if financed activity revenues permit or interest rate movements benefit acceleration. For the borrower, the system attempts to create a flexible borrowing arrangement on a long-term basis.

The present invention provides a means of assuring the borrower's ability to pay its contractual obligations under the loan agreement. For the lender, the system is designed to provide a method of compensating the lender within a range above the rate on government securities of similar term to that remaining on the financial instrument. Only in an event which would increase borrower insolvency could the rate paid by the borrower be less than the rate on government securities of similar term. To compensate for this possibility, when the borrower's activities are generating profits, the system provides a means of increasing the rate of interest paid to the lender.

The system involves a process of identifying the project or activity to be financed, seeking lender support through the use of financial intermediaries, investment bankers and other professionals, then issuing a financial instrument through data processing means including input means, calculator means responsive to the formula and instrument terms and conditions, data storage means and output means by terminal screen and/or printing.

The present invention may include data processing for a novel form of relationship management links between various accounts each with one or more account entries established to assist the borrower in determining and managing its liabilities to the lender, marketing agents, financial intermediaries, investment bankers, and others, as well as funds allocated to various projects, investments, risk taking activities, investment managers and custodians.

Upon issuance of the instrument, the system determines the present value of the principal, initial period interest, and minimum annual interest to be paid under the financial instrument, based on repayment terms, as well as current interest rates on non-callable fixed rate investment securities.

Based on such computations and other general considerations, several accounts are created on the books of the borrower using data processing systems or books and ledgers. As contemplated under the present invention, the accounts are characterized as the balance account, the payment account, the purpose account, and the computational account.

To the balance account is initially allocated the principal component which is the initial cash balance of the investment. Annually, an interest component determined by multiplying the principal and accrued interest balance by the interest crediting rate is added to the balance account. Then, any interest or principal payment made during the year is deducted from the account, leaving the outstanding balance of principal and accrued interest due the lender.

The system initially allocates a sufficient portion of the principal component to the payment account which when compounded at assured interest rates, is sufficient to timely liquidate the initial period interest rate, the minimum rate of interest and the principal at maturity. Annually, an accrual component is added to the payment account, based on an interest rate established at inception. The account is further reduced by any payments of principal and interest made during the year.

The system may include one or more purpose accounts to which the remaining portion of the principal component is initially allocated. These accounts are used to track funds allocated to various risk taking, investment, and administrative activities. Annually, these accounts are adjusted to reflect gains and losses, reallocations, distributions, and other considerations affecting account balances.

Amounts representing gains on purpose accounts are annually added to the computational account. This account is used to determine the annual formula rate of the present invention. Each year, amounts credited to the computational account, along with certain pre-agreed adjustments which may include reallocation or amortization components, result in a balance which is divided by the year-end balance of the balance account. The resulting percentage is the formula rate.

Prior to issuance of the financial instrument, the borrower and lender agree the minimum interest rate which may be set annually by the borrower, in addition to the method of computing several contractual rates. After reviewing the purpose of the financing, the borrower and lender agree a maximum rate cap. This is an interest rate at which the financed activity would experience difficulty in repayment if sustained for a prolonged period; and provides adequate compensation to the lender if rates substantially increased.

The next rate is the remaining term government rate which is the current interest rate on a fixed rate government security of similar term. The remaining term government rate is the preferred external benchmark rate though other rates may be used as benchmarks in the practice of the present invention. The remaining term government rate is the rate a government security i.e. U.S. government bond is yielding depending on the year remaining to maturity. For example, a 30-year U.S. treasury bond with 15 years to maturity may have a rate of 7.5% while a 30 year bond with 25 years remaining might have a higher rate. Finally, there is the maximum annual rate which is determined by adding an agreed number of basis points set at issuance to the remaining term government rate and represents the conditional maximum rate of compensation to the lender.

Each year the system compares the formula rate to these contractually determined external market rate data. If the formula rate exceeds the lower of the maximum rate cap or the maximum annual rate, then the rate for the coming year will be set at the lower of the three rates. If the formula rate is above the remaining term government rate, but below the lower of the maximum rate cap and the maximum annual rate, then the borrower must set the annual adjustable interest rate for the coming year above the formula rate and below the lower of the maximum rate cap and the maximum annual rate. If the formula rate is below the remaining term government rate, then the borrower will attempt to establish the annual adjustable interest rate at or near the remaining term government rate based on various pre-agreed conditions, unless to do so would substantially reduce the overall credit of the borrower. In no event would the borrower set the annual adjustable interest rate below the minimum interest rate.

Payments to the lender are principally based on the remaining term government rate as modified by the terms of the loan agreement are herein described. Such government term rate is inputted into the system each year or other period so that the return to the lender continues to reflect market rates for fixed rate government instruments of similar maturity. Preferably, such rate input is made at the end of the period when performance during the period is computed to determine the ranges of payments that the lender may receive in accordance with the loan instrument. The financial institution, acting through its board of directors, management or other decision-making group, then determines the specific payment to be made.

Once established, the system of the present invention projects the amount of interest accrued at the end of the next year, based on the newly determined annual adjustable interest rate and the maximum balance in the balance account for the coming year. It then discounts the prospective interest balance based on current government interest rates for the period. This discounted value less interest amounts accrued in the payment account is added to the payment account and deducted from the computational account.

If the resulting computational account balance is negative, then additional amounts may be deducted from the purpose accounts or advanced from other sources by the borrower. The computational account records advances by borrower from other than purpose accounts as notional advance balances. If the resulting computational account balance remains positive, then the borrower will reallocate said amounts to the purpose accounts or as otherwise provided in the original terms of the financial instrument. In any event, at the end of the computational process, the computational account balance is reset to zero each year.

At the end of each period, the borrower may transfer from the administrative account a percentage of the principal or other annual amount. Except for such amount, all monies earned or accumulated in the accounts are not withdrawn until the maturity date or earlier acceleration. Monies in the purpose account during the life of the loan provide security to the lender in that such funds are there to assure payment of annual interest.

The system of the present invention also monitors and projects the affects of changes in interest rates on the financing. The system discounts the payment account by the current interest rate for government securities of similar term. It then computes the minimum requirements to accelerate the financing, to determine if acceleration is an option.

Generally, the instrument is issued with one of two acceleration options. One involves the lender having received a pre-agreed interest rate over the period. This may be a specific interest rate for each period, or one determined by adjusting the remaining term government rate for each period by an agreed number of basis points. Under this option, the system determines whether payments, including principal and accrued interest to be paid on acceleration, have provided the agreed return. If less than the computed rate has been paid, an acceleration "premium" is paid by the borrower to enhance the lender's interest return.

The second option involves acceleration of a significant portion of the financial instrument. This portion, in some instances, may be accelerated without regard to previous interest earnings. Such an acceleration would result in a reduction of the balance account by the percentage of the financial instrument accelerated. The payment account would be recalculated to an amount sufficient to liquidate the remaining liabilities in the balance account. The amount subject to transfer from the payment account is then recalculated at the current remaining term government rate. This revised amount is then reallocated to the purpose account(s) or in such other manner as provided in the financial instrument. Such an action will generally result in increased interest earnings credited to the remaining portion of the financial instrument in future years.

The system of the present invention may rely on data processing means to determine annual and more frequent balances in each of the accounts and the components thereto. By varying the manner in which each respective component in the system is accrued or reallocated, the cashflow characteristics of various accounts can be significantly altered to fit the respective objectives of the borrower and lender.

The present invention addresses many of the problems of the prior art. For the borrower, it establishes a maximum rate of interest for the financing, which the financed activity is projected to be capable to sustaining for a reasonable period. It provides the borrower the ability to potentially pay lower interest rates if rates decline. It also allows the borrower to accelerate the financing if rates decline significantly or the financed activity generates sufficient revenue to accelerate repayment.

A lender's primary risks are: i) changes in interest rates during the life of the loan, and ii) the ability of the borrower to repay principal and interest. It can enhance its return through extending the term for which its funds are employed; accepting increased credit risk, and accepting fixed rate interest.

The present invention reduces a lender's exposure to changing interest rates through annual adjustments to the interest rate. It enhances the borrower's ability to repay principal and interest through assuring repayment of principal and a minimum rate of interest, thereby reducing credit exposure to the borrower. The lender's compensation is enhanced through a long-term lending relationship with the borrower, thereby reducing transaction costs. In many ways, It is similar to a long-term commitment to annually renew the loan. For this long-term commitment the lender is generally expected to receive interest at an annual rate exceeding the remaining term government rate for securities of similar maturity. Thus the lender's compensation adjusts to reflect changes in inflation and other risks which affect market interest rates.

The borrower's solvency with respect to a particular contract is decreased and/or its credit quality deteriorates when the revenues generated by assets in the borrower's purpose accounts dedicated to such financial contract and other assets assigned to such contract are insufficient to meet payments based on an interest crediting rate set at the minimum target rate.

In exchange for allowing the borrower to reduce interest payments if its financial condition with respect to the business activity financed deteriorates thereby increasing solvency and credit quality, the lender otherwise receives above market interest. In the event interest rates decline or the borrower otherwise determines acceleration of the instrument to be of benefit, the lender gains through increased interest.

BRIEF DESCRIPTION OF THE DRAWINGS

These as well as other features of this invention will be better appreciated by reading the following detailed description of a presently preferred exemplary embodiment taken in conjunction with the accompanying drawings of which.

DETAILED DESCRIPTION OF THE PREFERRED EMBODIMENTS

An Overview of the System

Figure 1:
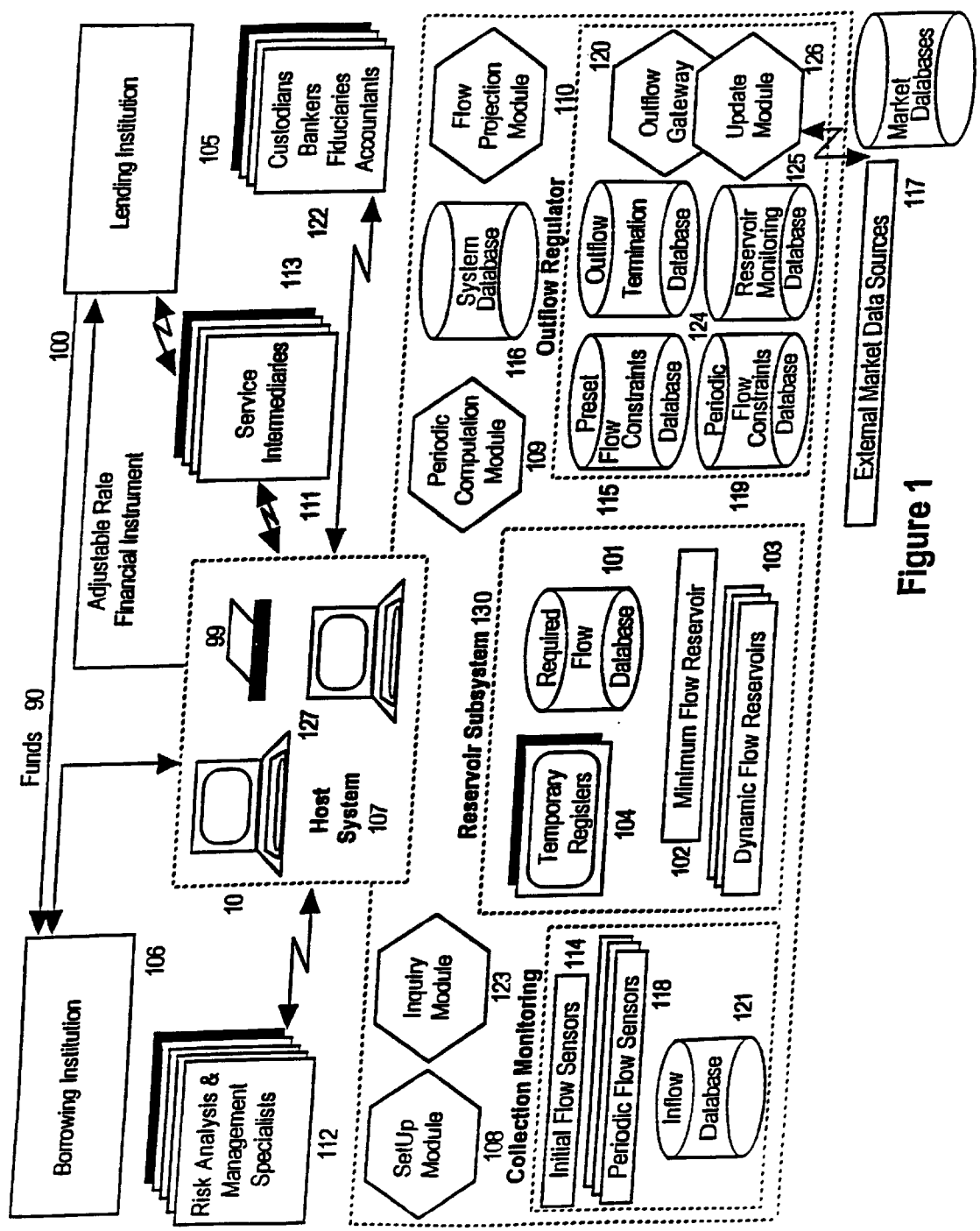
FIG. 1 is an overall schematic for implementing the adjustable rate loan system.

Referring now to FIG. 1, there is shown in overall scope an operational flow chart for implementing the adjustable rate loan system 10 of the present invention. As therein depicted, the broad aspects of the system include an adjustable rate financial instrument 100 printed by printer 99; various computational accounts FIG. 2 which may include a balance account 111a stored in data base 101, a payment account 102a processed as minimum flow reservoir 102, one or more purpose accounts 103a processed in dynamic flow reservoirs 103, and a computational account 104a processed by temporary registers 104; a lending institution 105; a borrowing institution 106; and an account management data processor 127 in host system 107.

Figure 2:
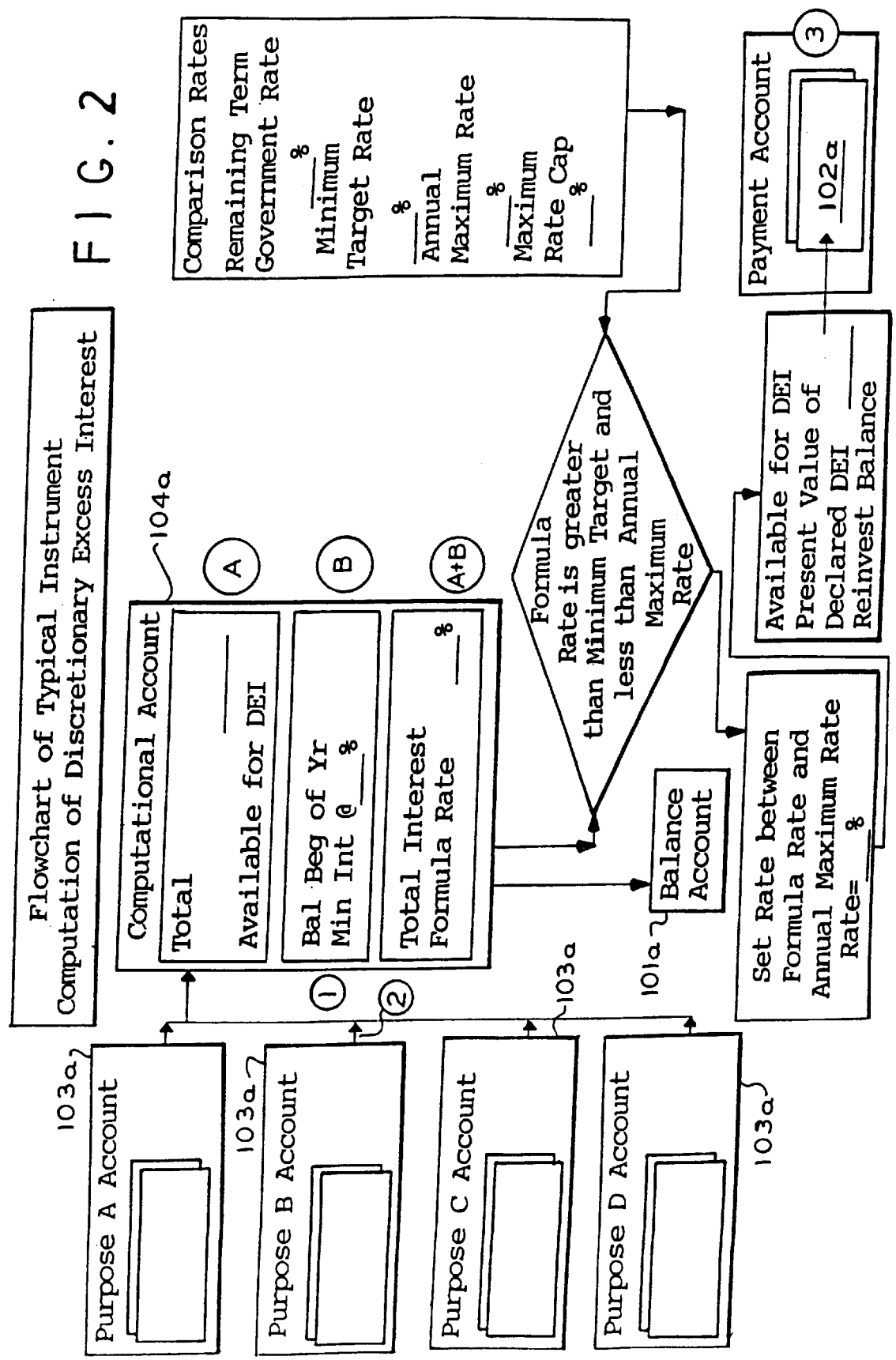
FIG. 2 is a diagram for determining the annual interest crediting rate.

In the most basic embodiment of the present invention, the borrowing institution 106 receives funds 90 in exchange for the financial instrument 100, which are allocated first to the computational account 104a, FIG. 2, then to the payment account 102a processed in the minimum flow reservoir 102 and the various purpose accounts 103a processed in the dynamic flow reservoir 103. Funds allocated to the payment account 102a are available to pay principal, initial interest and a minimum rate of interest on the financial instrument 100. Funds allocated to purpose accounts 103a are generally used for risk taking and investment activities. Additional amounts are periodically reallocated to the payment account 102a for annual interest. The financial instrument 100 is designed to assure the repayment of principal and an annually adjusted rate of interest in excess of the rate on government securities of similar maturity.

Determination of annual interest to accrue for each subsequent year is partially implemented by the account management data processor 127 in host system 107. The data processing system 107 provides three primary functions: i) instrument and account setup in setup module 108, ii) annual servicing in periodic computation module 109, and iii) acceleration monitoring in flow projection module 110.

In FIG. 1, reservoir subsystem 130 includes the temporary registers 104, the required flow data base 101, the minimum flow reservoir 102 and the dynamic flow reservoir 103. The required flow data base 101 accommodates the balance account 110a (FIG. 2), the minimum flow reservoir 102 accommodates the payment account 102a (FIG. 2), the dynamic flow reservoir 103 accommodates the purpose accounts 103a and the temporary registers 104 are employed with the computational account 104a, FIG. 2.

While a data processing system 107 is preferred for use in carrying out the present method and system, alternative means may be used including telephone networks, facsimile machines, automatic typewriters, and other known office equipment and means for recording and storing information, for displaying such information, and for communicating information rapidly including directly communication between offices.

In FIG. 1, the outflow regulator 110 comprises a series of data bases including preset flow constraints data base 115, periodic flow constraints database 119, outflow termination database 124 and reservoir monitoring database 125. In addition, included is outflow gateway 120 and update module 126. The update module is updated with current market information from the market databases 117 which provides the current market data from market data sources.

Figure 6A:
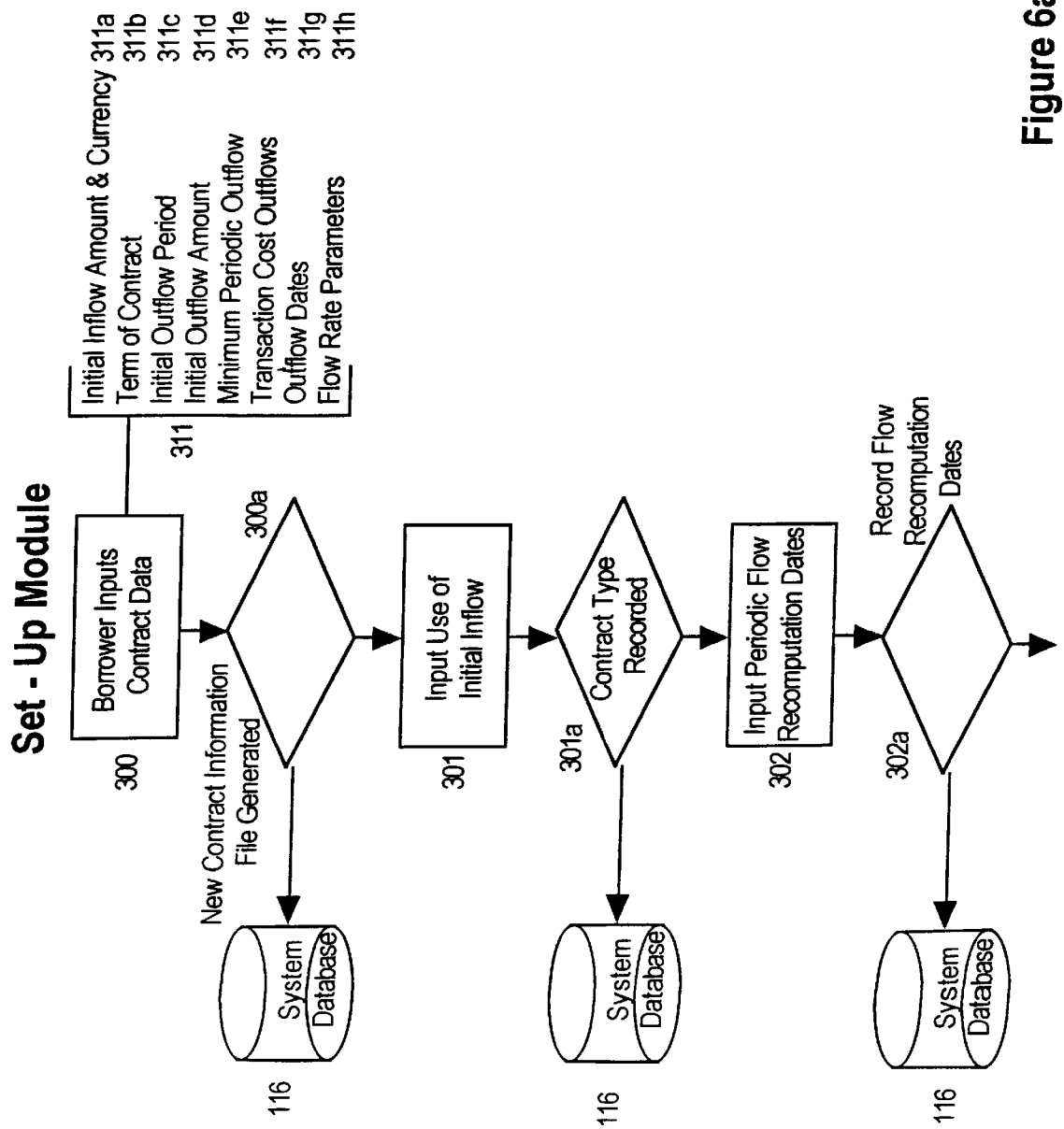
FIGS. 6a–6j are flow diagrams showing the set-up phase of the system.

Collection monitoring includes initial flow sensors 114, periodic flow sensors 118 and inflow database 121 for providing input information data for the system, see also FIG. 6a.

The instrument and account setup function (FIG. 6a–6f) in setup module 108 involves financial instrument 100 such as a loan agreement issuance 315 and account creation step 314; computation and allocation of initial balances between the accounts step 320; and database functions processing (FIG. 6a–6f) and storing initial contractual terms and conditions step 311. The annual servicing function (FIGS. 7a–7d) of module 109 as implemented by system 107 involves the recalculation and establishment step 425 of the annual adjustable interest rate between contractually specified minimum step 413 and maximum, steps 421, 421a, interest rate adjustments; monitoring gains and losses allocated to various accounts including recording and storing an account list of current balance information and an asset position list, step 408; determination of payments made to the lender institution 105 and other expenses step 407; the determination of the accreting balance step 404 of the financial instrument 100, and recomputation of annual account balances. Finally, the acceleration monitoring function (FIG. 8) of flow projection module 110 tracks changes in various interest rate indices step 502 as well as balances in various accounts steps 503, 504 to determine if it is beneficial for the borrower 106 to accelerate the financial instrument 100, thus fully or partially repaying step 506 the lender's 105 principal and/or accrued interest. It should be understood that the various modules and subsystems are implemented by computer program code as represented by the dashed lines interconnecting the modules and data bases to the host computer system 107.

The setup module 108 and inquiry module 123, FIG. 1, are used during the initial setup of the information required to produce the instrument 100. The inquiry model 123, FIG. 5a, comprises the initial inquiry as set forth including precontract inquiry step 140 after initial access at step 138 and validation at step 139.

The user inputs the desired terms at step 141 and the system then tracks the requests and information at step 142 via data base 116. The system data base 116 is used to review the restriction types at step 144 and the terms renegotiated if necessary at step 148. The agreed-to terms results in movement to the setup module 108 step 145.

When the user is validated, service inquiry is made at step 146, the contract holder (lender 105) inputs the data request at step 149 and the data base 116 is accessed at step 147. The remainder of the sequence regarding the inquiry made is self-explanatory from FIG. 5b.

Characteristics of the individual accounts are tailored to meet the requirements of the specific financial instrument to which they are ascribed. However, the system of the present invention need not be limited to the above mentioned fundamental aspects.

In the preferred embodiment, an insurance company, the borrower 106, is the entity which adopts the system 107, for the purpose of issuing and servicing adjustable rate single premium deferred annuities or guaranteed investment contracts, i.e., the loan agreement formed by instrument 100. Each guaranteed investment contract, instrument 100, may be designed to support a particular type of risk taking and/or investment activity of the insurer borrower 106. The insurance company borrower 106 may engage the services of various external analysts, underwriters, or investment managers 112, 122, as well as its internal staff to manage funds to be allocated to the various accounts identified to the financial instrument 100. It may focus its risk taking and investment activities on one or more specific activities, projects, types of investment, or investment manager. It then uses financial service intermediaries 113 and other marketing representatives who access the system 107 at line 111 to contact prospective institutions, i.e., lenders 105 to purchase these guaranteed investment contracts (financial instrument 100), for example a pension fund or another insurance company.

Instrument and Account SetUp

Prior to issuance of the financial instrument 100, the insurer, borrower 106 and lender 105 agree (step 300, FIG. 6a) upon the principal balance 311a and term 311b, an initial interest period 311c and initial interest rate 311d, as well as a minimum rate of interest step 311e, compounding and interest rate crediting dates 302, and principal and interest payment dates 311g. The interest crediting rate must be established annually by the insurer borrower 106 within a corridor of minimum and maximum contractually specified rate parameters 311h. A new file, step 300a, FIG. 6a, is generated and stored in data base 116.

The set-up module, FIG. 6a, step 300, wherein the borrower inputs contract data, includes the substeps of initial inflow amount and currency at step 311a, the term of the contract at step 311b, the initial outflow period at step 311c, the initial outflow amount at step[311d, the minimum periodic outflow at step 311e, the transaction cost outflows at step 311f, the outflow dates at step 311g and the flow rate parameters at step 311h.

The insurer borrower 106 and lender 105 review and input the purposes for which the borrowed funds 90 are expected to be utilized step 301 of the set-up module 108 (FIG. 6a) at inquiry module 123, FIG. 1, record the contract at step 301a and agree to a procedure for periodic rate recomputation, step 302 which is recorded at step 302a. The system 107 determines, via programmed software, the maximum benefit expected to be derived from the activity by the insurer borrower 106 and arrives at a maximum amount available for debt service using permitted terms data base 143, FIG. 5a. Based on the terms of the financial instrument 100, the system 107 computes a maximum rate of interest the insurer could sustain in a variety of interest rate scenarios, step 303, FIG. 6b, using data base 143 and calculated, displayed and recorded at step 303a. The insurer borrower and lender then negotiate the maximum rate of interest the insurer would ever be required to set, referred to as the maximum rate cap, step 304, recorded at step 304a. This would generally be a rate which the insurer borrower is expected to be able to pay for a reasonable period of time, even if financed activity revenues were not sufficient to pay this rate, without seriously impacting the insurer's financial condition, resulting in credit deterioration.

Figure 6B:
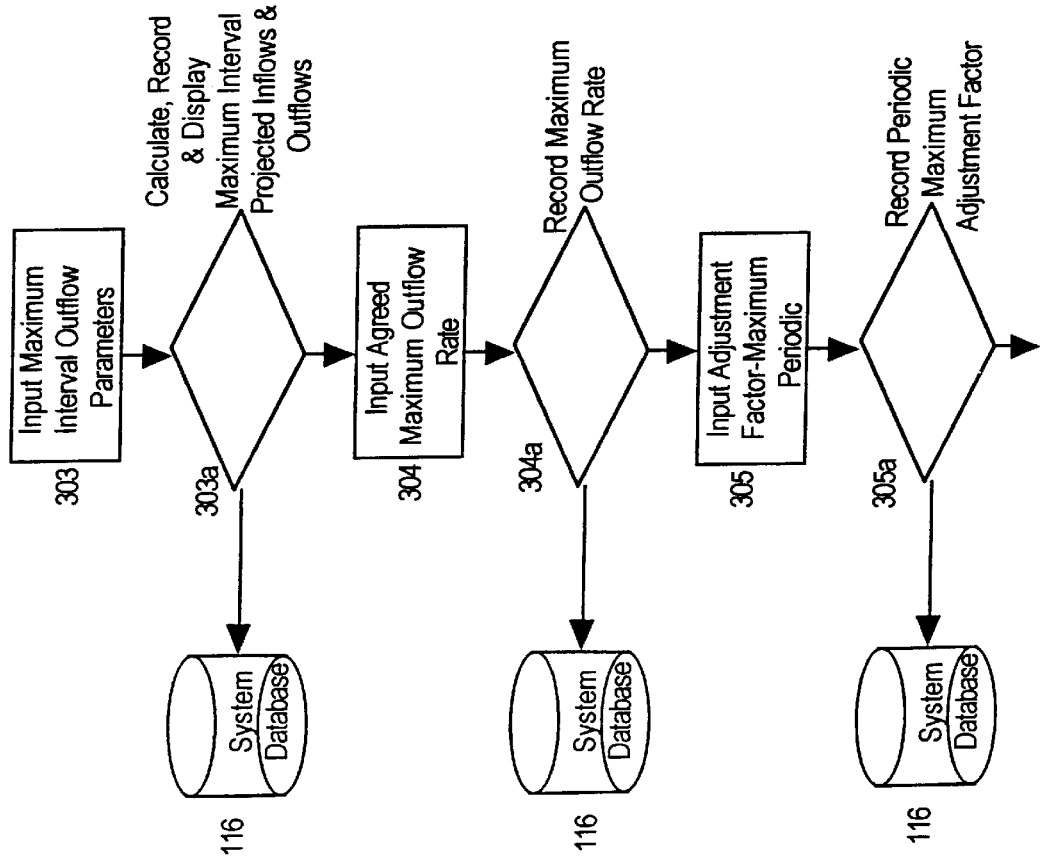

The insurer and lender then agree a basis point adjustment, step 305, FIG. 6b, recorded at step 305a to the remaining term government rate, step 306, to compute the maximum annual rate, step 307, FIG. 6b. For instance, if the current rate on government securities of similar term to the financial instrument was 7% (remaining term government rate) and the agreed basis point adjustment being 275 bp (2.75%), the maximum annual rate of interest would be 9.75% for that year. This is entered into the system 107.

Figure 6C:
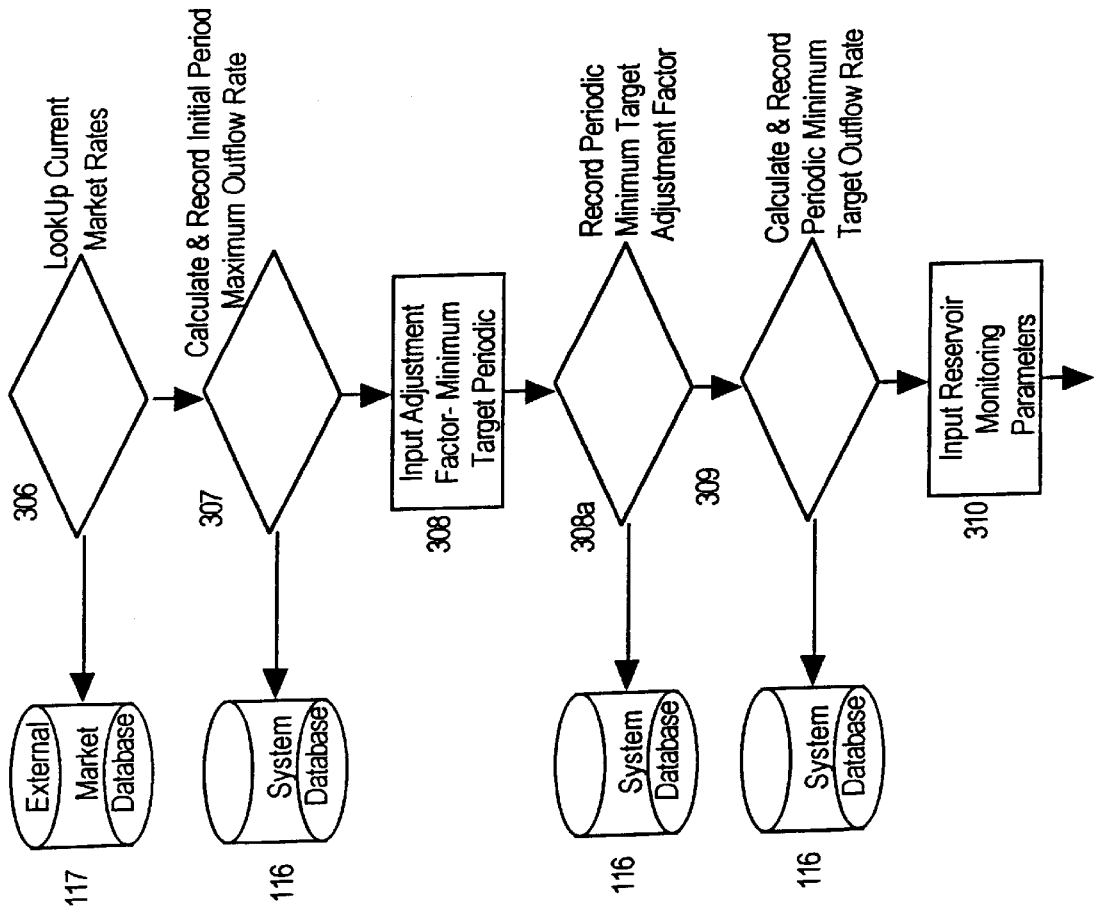

They then go on to agree the minimum target rate, step 308, FIG. 6c, entered into system 107 at step 308a, which is generally the remaining term government rate, but may be modified with a basis point adjustment factor. For example, the lender may wish the minimum target rate to be 50 bp above the remaining term government rate. For this period, the minimum target rate would be 7.5% (7% plus 50 bp). This is a rate which the insurer must attempt to exceed in establishing the interest crediting rate on an annual basis. This data is then stored in data base 116. The insurer and lender would agree what additional sources of revenue or capital assets the insurer would allocate to increase the interest crediting rate above this minimum target rate, step 309, FIG. 6c. Only in an instance where the insurer's other designated revenues and assets were not sufficient to increase the interest crediting rate above this rate, would the interest crediting rate be set below this rate. This provision permits the insurer to lower the rate below the minimum target rate if its financial condition would not otherwise permit establishing the higher rate. Again, it is designed to maintain insurer solvency. The alternate benefit for the lender is that the interest crediting rate entered into the system will generally always be set above the remaining term government rate, which in effect initially provides a long term financial instrument 100 with an adjustable rate entered into the system tied to long term government rates. This data is stored in data base 116.

Finally, the insurer and lender agree on the method of computing the formula rate including the computational parameters of the formula, step 310, FIG. 6c, stored in the system at step 310a. Generally, this will involve deducting the value of one or more purpose accounts at the previous computational date from the value on the current computational date as stored previously. This amount may then be increased or decreased through agreed amortization or reallocation adjustments. The result is then divided by the projected balance of the financial instrument 100 on the next interest crediting date by the system, resulting in a percentage which is the formula rate for the coming year. This formula is stored in data base 116.

The insurer and lender then agree that the insurer will reestablish the interest crediting rate each year on the interest crediting date, which, in effect, resets periodic compensation. If the formula rate exceeds the maximum rate cap or the maximum annual rate, the insurer covenants to establish the new rate at the lower of the three rates. This data is then stored. If the formula is below the minimum target rate, the insurer contracts to use its best efforts to establish the rate at or above the minimum target rate, but agrees that under no circumstances will the rate be set below the minimum interest rate. If the formula rate is above the minimum target rate and below the maximum rate cap and the maximum annual rate, then the insurer agrees to establish the rate between the lower of the maximum rate cap and the maximum annual rate, and the formula rate. This is stored in the system 107 data base 116.

Figure 6D:
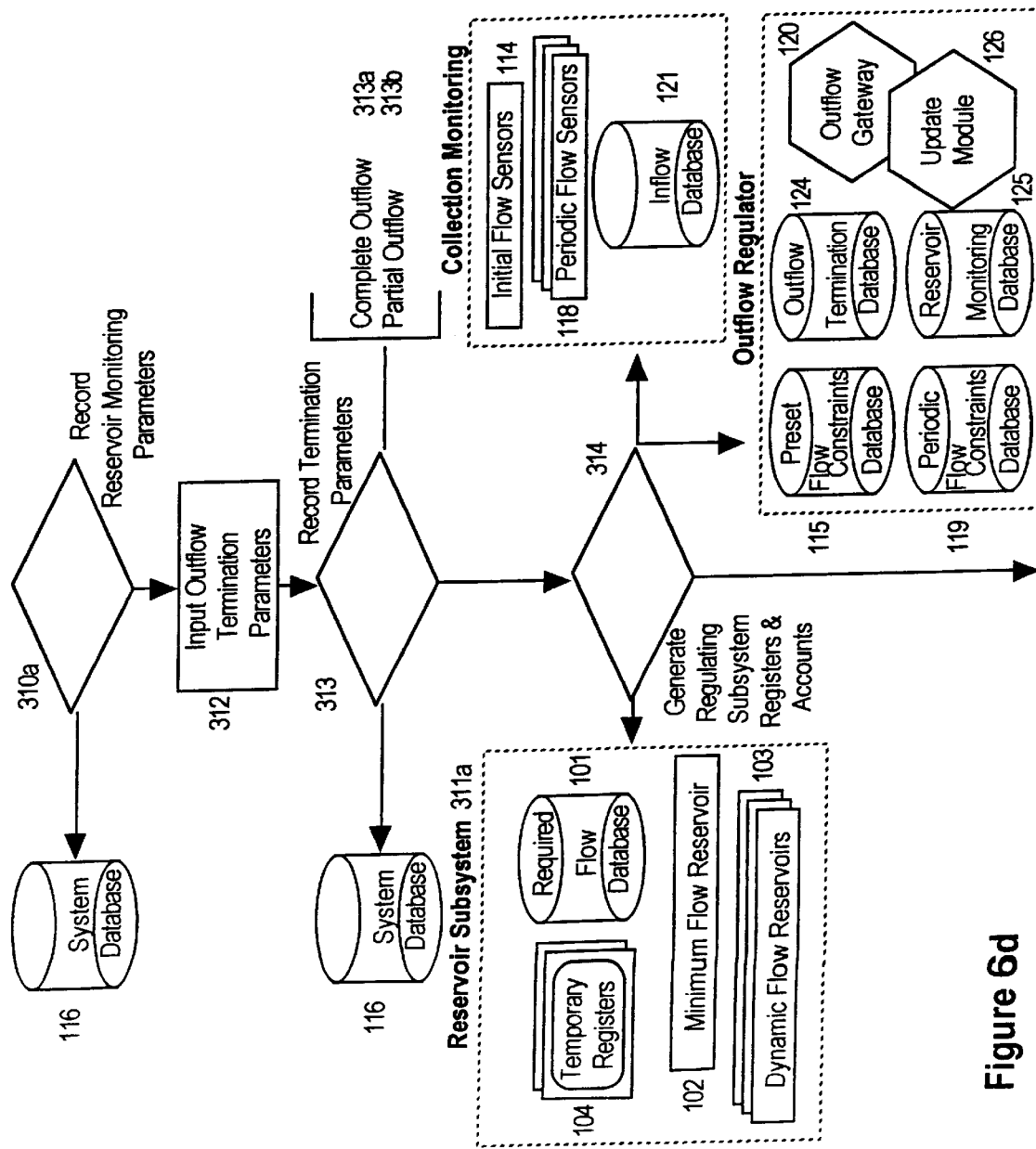
Figure 6E:
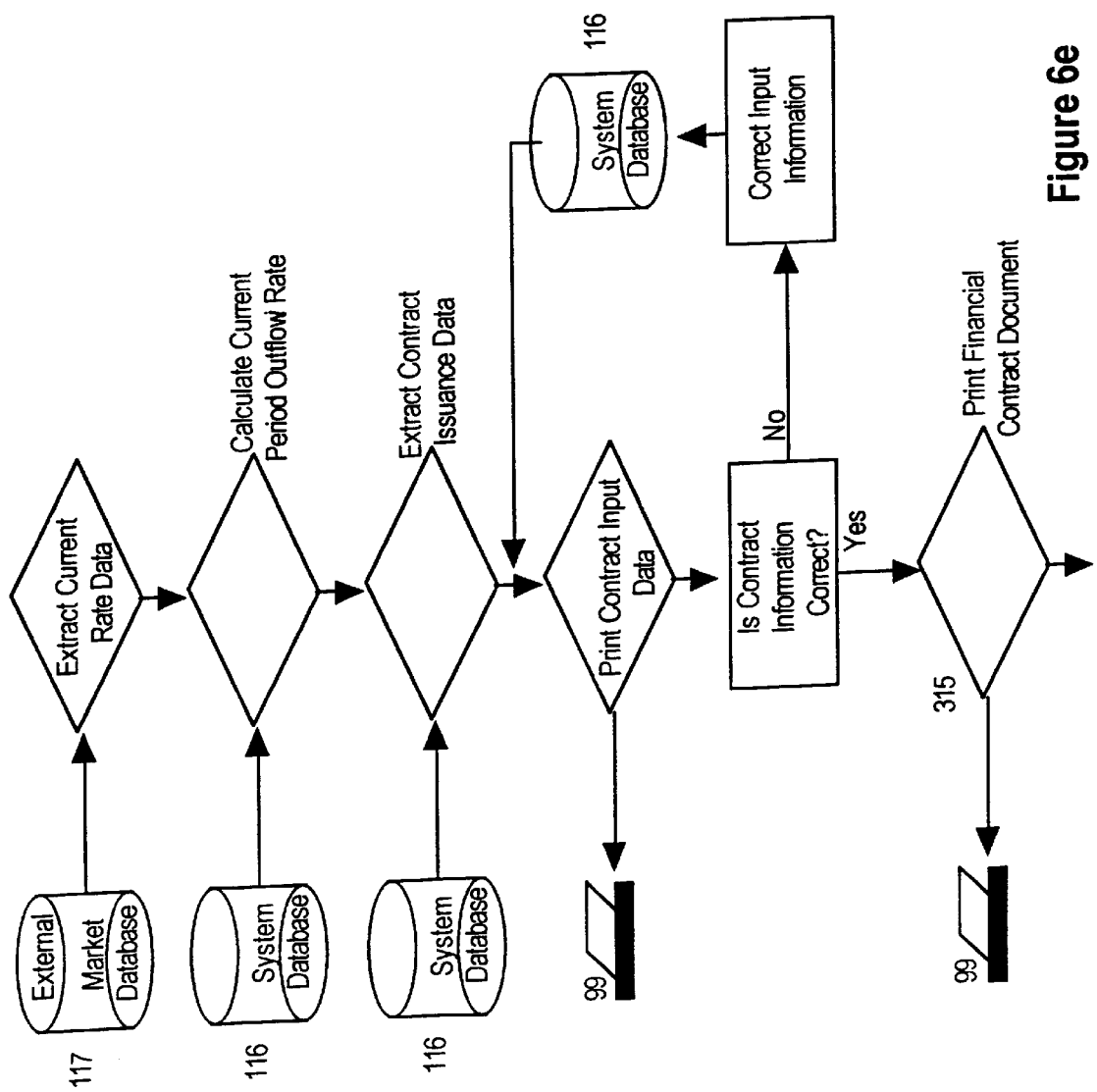

Terms of acceleration or premature termination of the financial instrument are negotiated, step 312, FIG. 6d and recorded in the system database 116 at step 313, which includes substep 313a for completing the outflow or completing the partial outflow at step 313b. Since the financed activity may terminate prior to the maturity date of the financial instrument, interest rates may affect the long-term cost of the financing, or a variety of other factors may change; the insurer 102 negotiates the conditions under which it can prepay the lender 105. Prepayment may involve increased transaction costs for the lender in having to re-employ the funds. Acceleration will generally involve one of two options, although other conditions could be agreed between the parties. For instance, the insurer may be prohibited from accelerating for a minimum term, such as five years, step 312, FIG. 6c, which is stored in data base 116 step 313.

First, the insurer could agree to pay an acceleration "premium" if the interest crediting rate in each prior year was below an agreed minimum. For instance, the insurer may agree that the lender will receive a minimum of 250 bp over the remaining term government rate for each year. If the interest crediting rate was below this minimum in any previous year, based an agreed formula, an acceleration premium would be calculated to bring the lender's yield on the financial instrument over the term to 250 bp over the remaining term government rate for each year.

Another option involves the insurer borrower 106 being restricted to accelerating only a percentage of the financial instrument 100. For instance, the insurer may be able to prepay 80% of the financial instrument. This option may allow the insurer to sell a portion of its securities supporting the financial instrument at a substantial market profit if interest rates declined. To the extent these gains above repayment of principal and interest were reallocated to the purpose accounts stored in the system, the formula rate in future years would likely increase for the remaining outstanding balance of the financial instrument.

Upon agreement of the aforementioned terms and conditions and input of this data into the system 107, the data processing system 127 generates various accounts, step 314, using the data bases 116 and so on, on the books of the insurer and an adjustable rate financial instrument 100 which guarantees return of principal and payment of an adjustable rate of interest over a specified period of time. These accounts, for example, as shown in FIG. 2, are generated utilizing the registers 104, data base 101, and reservoirs 102 and 103. The financial instrument 100 may be issued in any amount and currency as a debt obligation, an annuity contract, a guaranteed investment contract, a certificate of deposit, a note or other form. It may be an obligation of an insurance company, bank, single purpose corporation, a trust or other entity.

Figure 3:
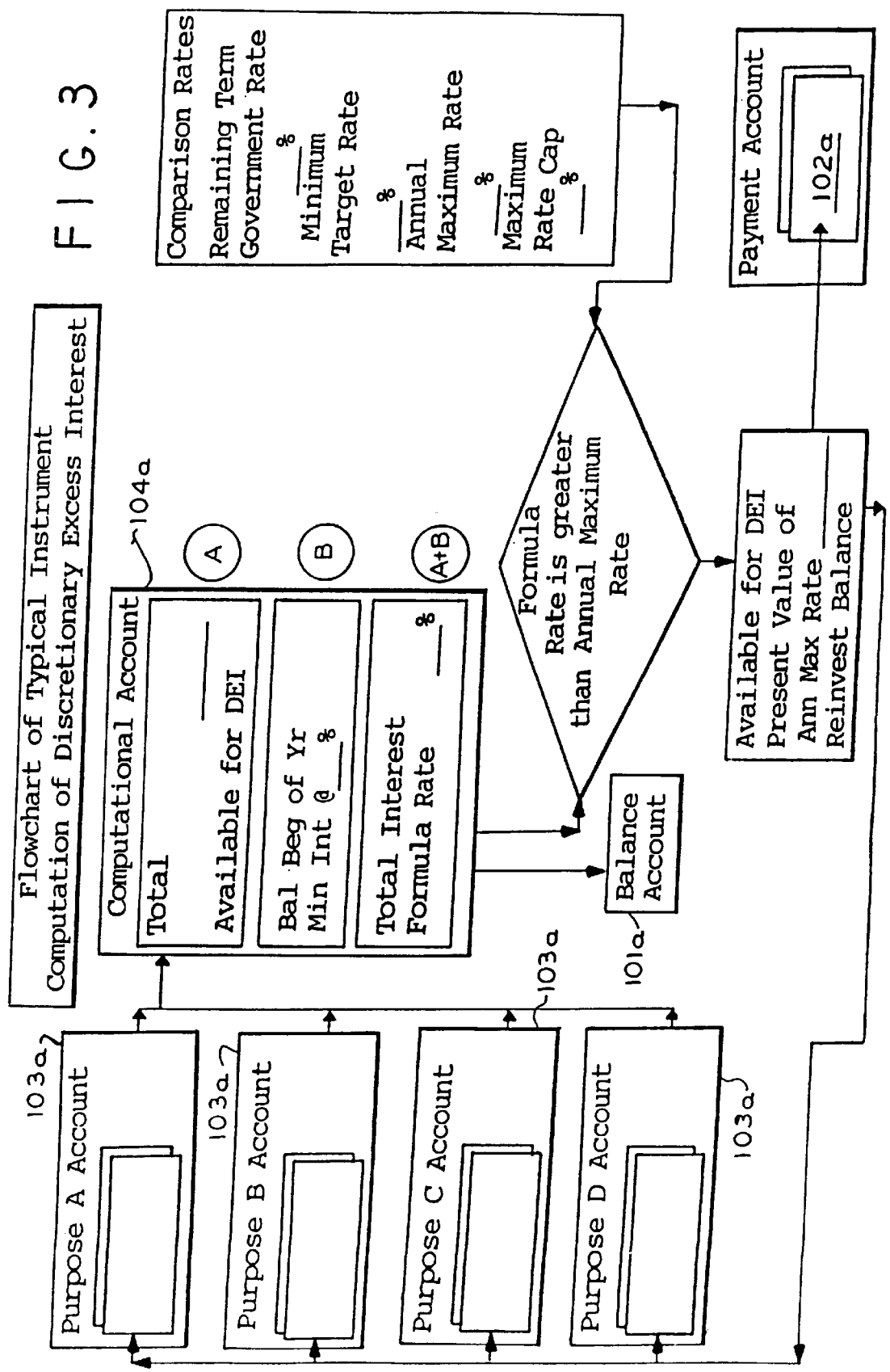
FIG. 3 is a diagram for re-employing funds within the system if they exceed the amount necessary for the subsequent year's interest requirements.
Figure 4:
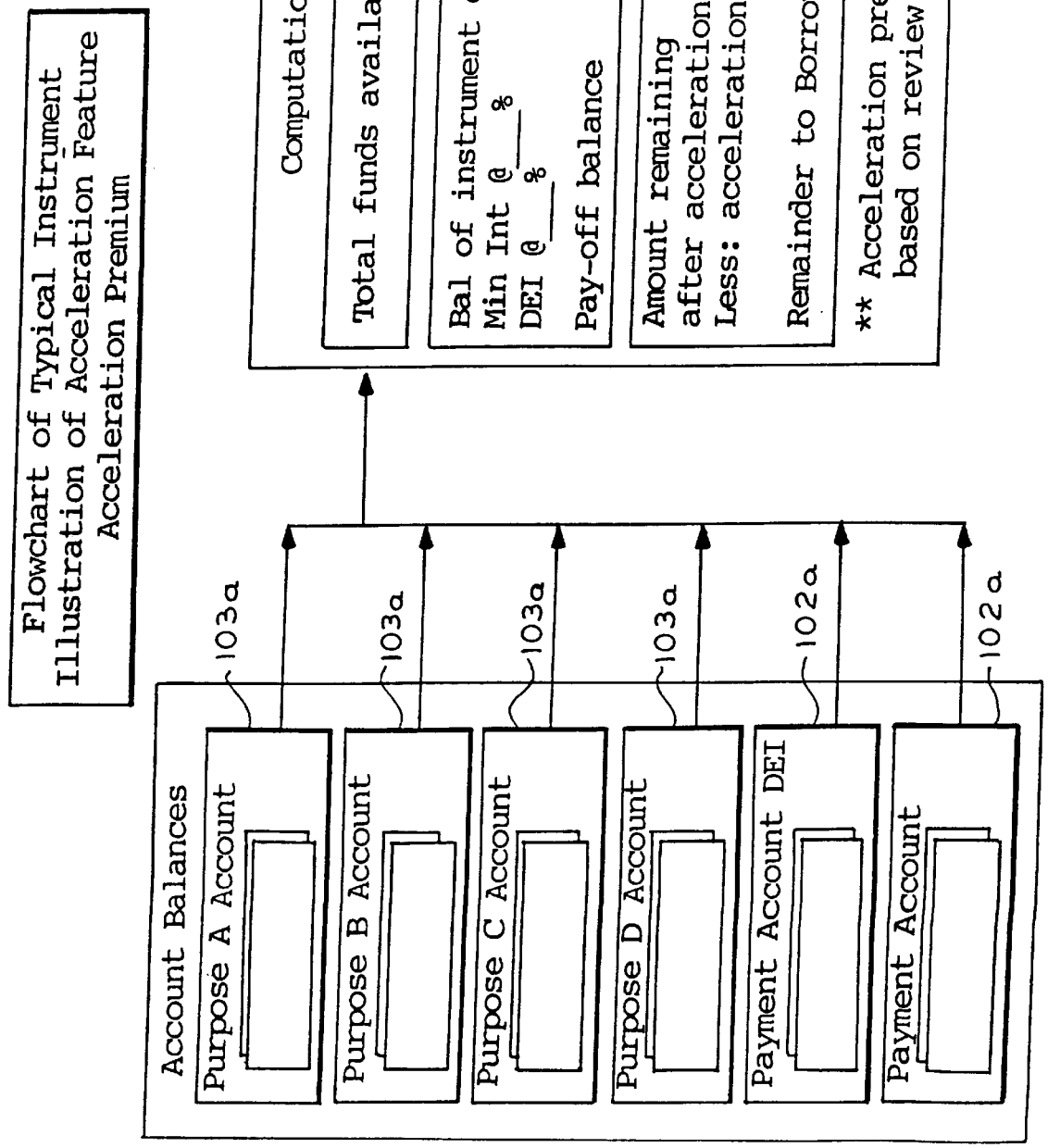
FIG. 4 is a schematic of an acceleration option.

In general, four basic types of accounts, FIGS. 2, 3 and 4 represented by the designations "balance" account 100a, "payment" account 102a, "purpose" account 103a and "computational" account 104a, are created in system 107 and contemplated under the present invention.

In their most basic embodiment, balance accounts 101a established in the required flow data base 101, FIG. 6d and FIG. 1, include those accounts to which the original principal component is added, along with annual interest components as they periodically accrue, less payments made to the lender. Generally, reductions in amounts allocated to a balance account will consist of the retirement of the entire principal at the end of the term of the instrument. The annual interest component, on the other hand, is retired by the system as it accrues at each iteration period, or a portion may be retired and the minimum interest portion accrued. If the interest component is annually paid, this results in an instrument 100 having cash flows closely resembling those of a "conventional" certificate of deposit or bond ("conventional" referring to payment of a fixed rate of interest) with the difference that interest payments will vary based on the adjustable rate established each year by the insurer. In either case, the cash flow characteristics of balance accounts can be characterized generally as low during the term of the instrument, with a large payment at the end. However, other principal and interest retirement schedules are possible may be implemented within the balance account framework by system 107, and cash flows could be accelerated through earlier payments of a portion of the principal and/or accrued minimum interest by the system 107 established in the minimum flow reservoir 102.

To each payment account, FIGS. 2 and 3, is originally allocated the present value of the principal component, initial interest component for the initial compensation period, and minimum interest components, discounted at then current interest rates for government securities of similar term. Periodically, these amounts are increased by accrual at the prescribed interest rate by the system 107, being the discount rate, as well as annual additions to the interest component, less payments made to the lender.

Each financial instrument 100may have one or more purpose accounts 103a, FIGS. 2, 3 and 4 established in dynamic flow reservoirs 103 identified to it. To these accounts are originally allocated by the system 107 one or more purpose accounts 103a, FIGS. 2, 3 and 4. These may be used to finance one or more specific activities of the insurer borrower, including the payment of certain future custodial, administrative, and professional costs and may include marketable securities, evidences of ownership or other financial instruments including, of course, short term rates and bills and cash. Also, purpose accounts 103a may at times include non-liquid and nonmarketable instruments entered into the system 107. These accounts are annually adjusted by system 107 to reflect gains or losses on financed activities, and other amounts expended as entered into the system 107.

Finally, computational accounts 104a FIGS. 2, 3 and 4 established in temporary registers 104, FIG. 1, are used by the system 107 to initially allocate amounts between the payment account 102a and the purpose accounts 103a, and annually to determine the formula rate, and once the adjustable rate for the coming year is determined, to rebalance the various accounts, completing the cycle with a balance of zero.

Figure 6F:
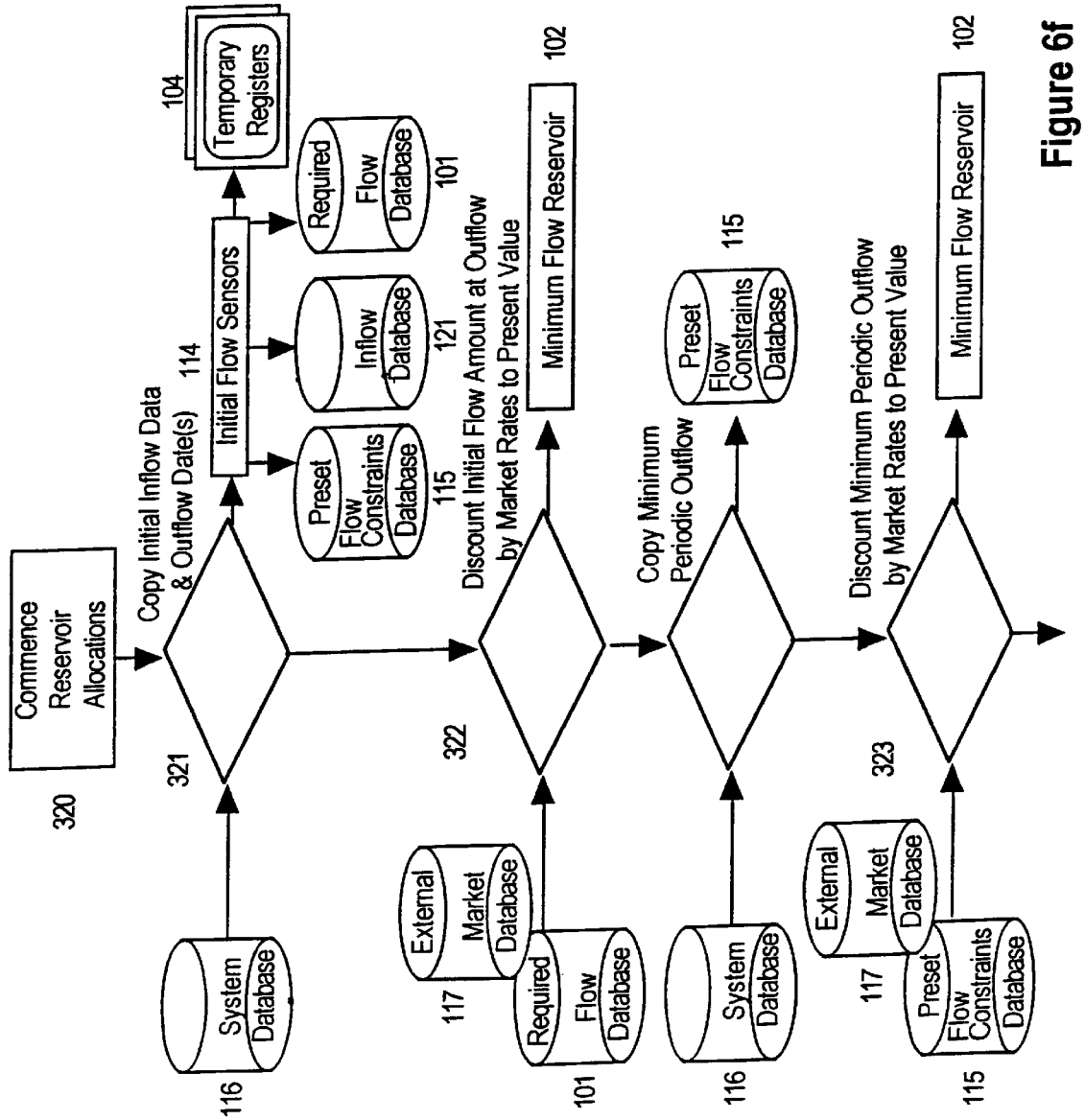
Figure 6G:
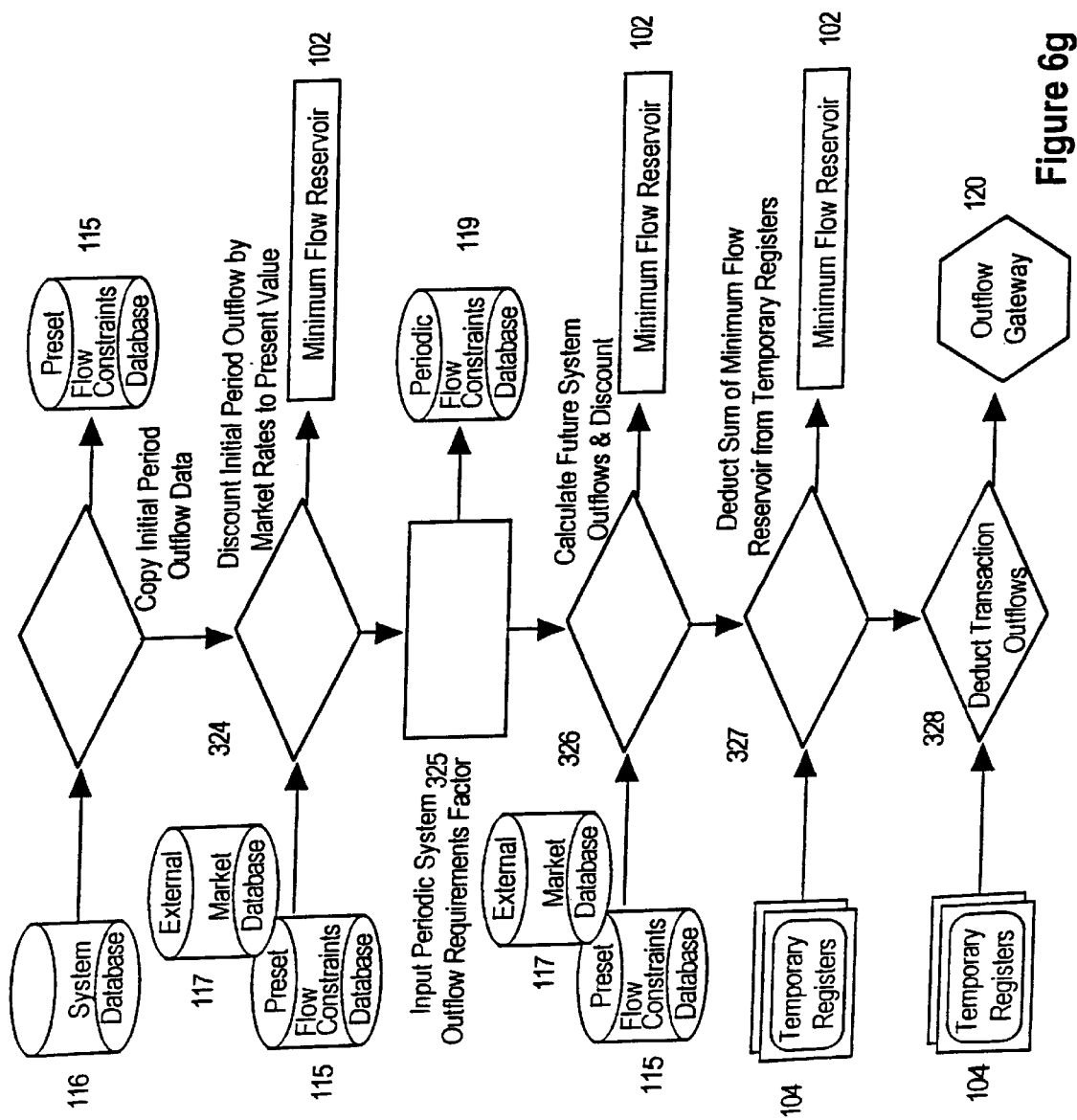
Figure 6H:
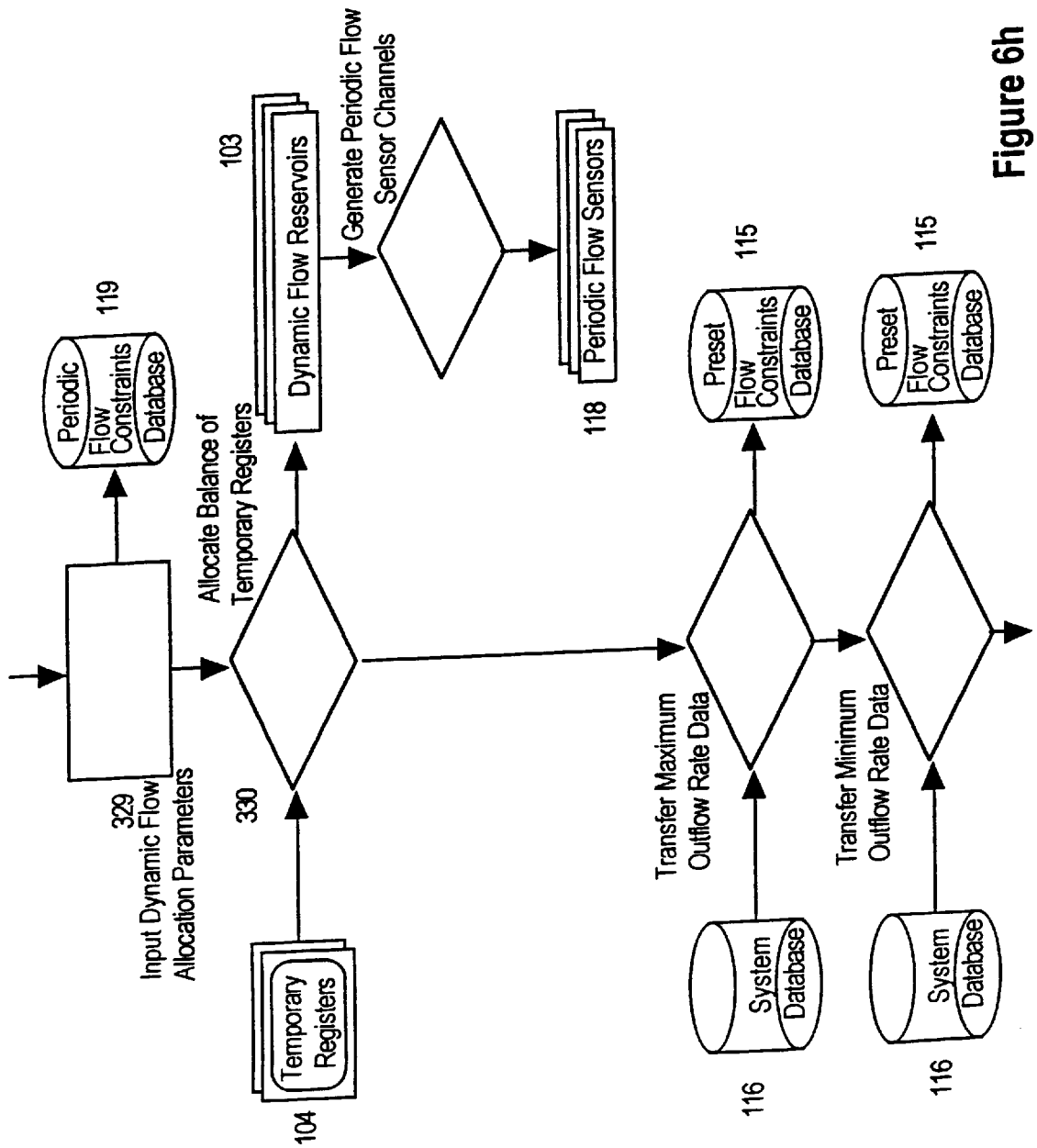
Figure 6I:
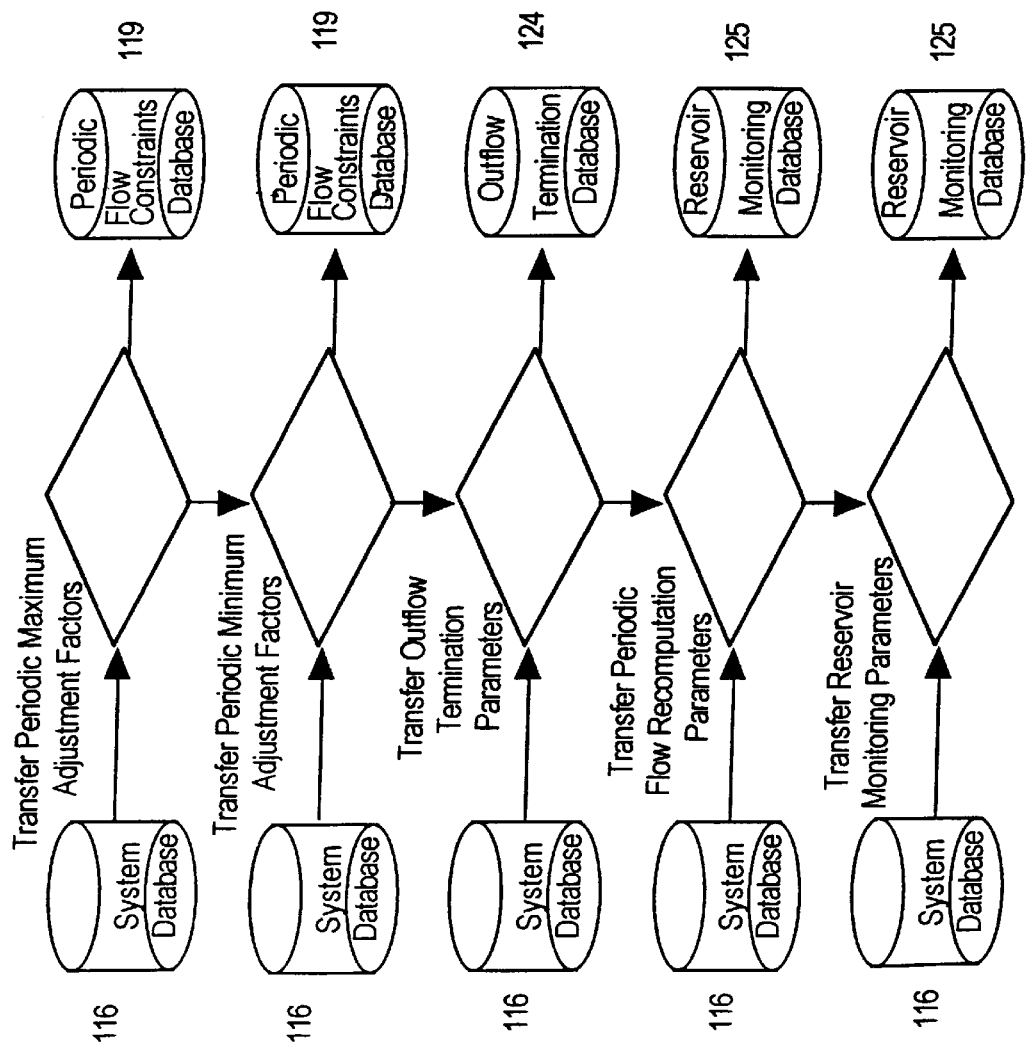
Figure 6J:
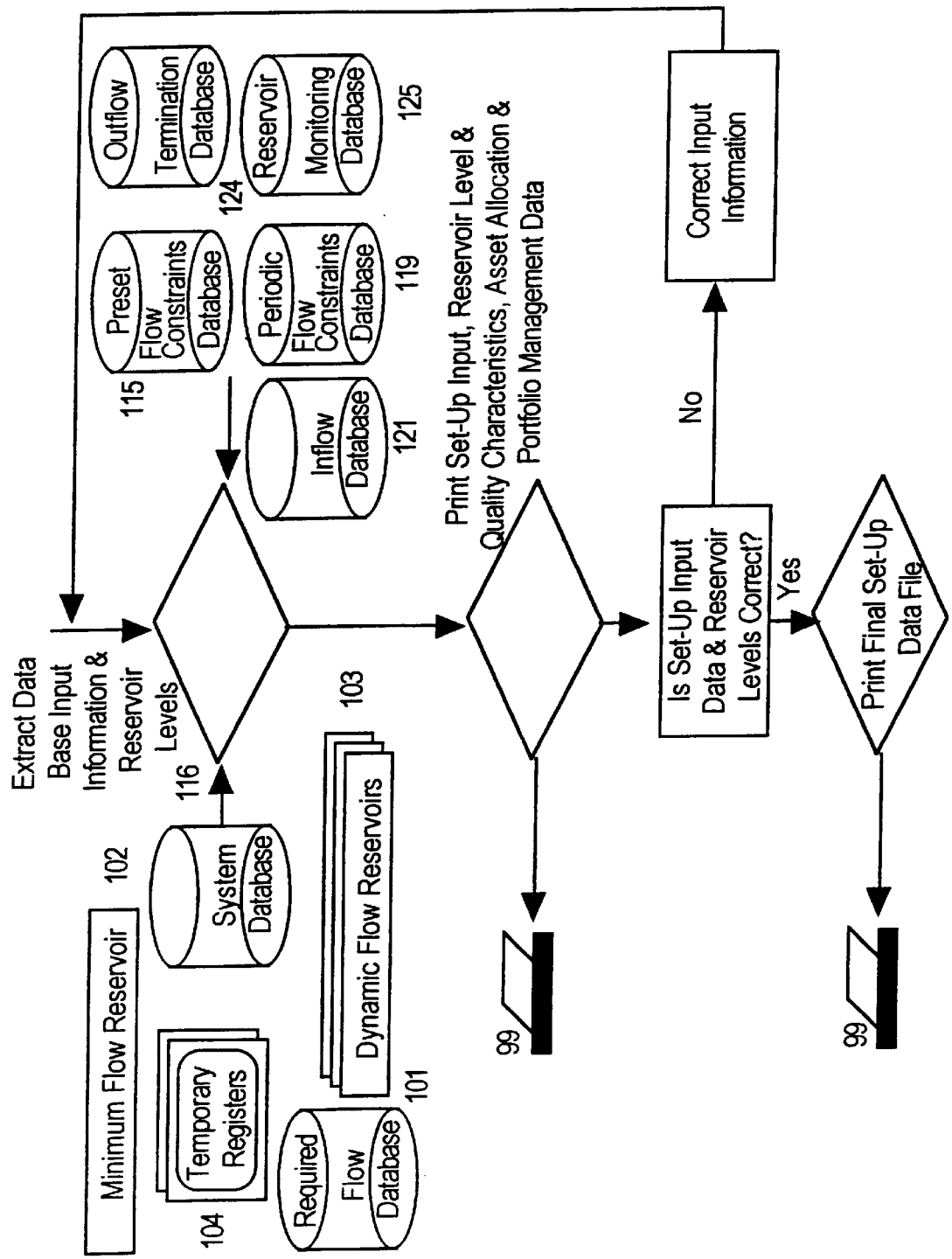

The system 107 then allocates various original balances to each of the accounts at the time of issuance at steps 320 (FIG. 6f) and 330 (FIG. 6h). The data at step 320 is stored in data base 116. In particular the principal component is allocated to the balance account 110a. To the computational account is added the principal component allocated to the balance account 101a less an amount determined by discounting at current government securities rates, the principal balance, initial interest component, and minimum interest components, which is allocated to the payment account. The difference, less certain agreed transactional expenses are then allocated to one or more purpose accounts, including an amount for future custodial, legal and administrative costs. The computational account balance at the end of the allocation process returns to zero. The balance is allocated at step 330 to temporary registers 104 and dynamic flow reservoirs 103 for further processing as shown in FIG. 6h.

An Example

An insurer, i.e, borrower 106, issues a $1,000,000 financial instrument 100 for a 20 year term, described as a guaranteed investment contract to be booked as an adjustable rate debt obligation. Its initial period interest rate is 8%, with the initial period being one year. It agrees to compound interest annually and adjust the interest rate prospectively on December 31 of each year, but will not set it below a rate of 4%. It further agrees to repay principal at maturity in 20 years, to accrue the minimum interest component (4%) to be paid at maturity, and to pay that portion of the annual interest component which exceeds the minimum interest component annually, on December 31 with this data inputted into the system 107, the instrument 100 is printed by printer 99 at step 315, FIG. 6c.

To arrive at the minimum and maximum contractually specified rates from which the interest crediting rate is determined, the insurer reviews projected cash flows from its proposed financing activity. For illustration purposes, assume the insurer will acquire certain types of municipal equipment, such as computers, police cars, and other necessary equipment to be leased to municipal governments on a tax exempt basis. If the funds are fully deployed and property/liability losses, as well as expenses kept to a minimum, it expects to earn 13–15% per annum. In addition, as an insurer, it may derive certain tax advantages from the transaction. Because the leases are generally short-term, if interest rates increase the insurer will be able to increase its return on these leases somewhat. Based on these factors, possibly in consultation with the potential purchaser of the financial instrument (lender), it determines it could pay a rate of 13% interest for a period of time should rates substantially increase. This determination is made at step 303, FIG. 6b, and stored in data base 116. It therefore sets a maximum rate cap of 13% on the instrument, step 304, FIG. 6b. In effect, the interest crediting rate could never exceed 13%. This is entered into system 107 insert at step 304a. In purchasing the instrument, the lender 105 makes a decision that such a rate would provide it sufficient compensation during such a high rate period, when compared with its cost of funds or other investment objectives.

As previously assumed, the remaining term government rate at inception, i.e., the 20 year treasury bond rate, is assumed at 7%, step 306, FIG. 6b and recorded in external market data base 117. The insurer and lender agree the annual maximum rate will be established at 275 bp (2.75%), step 305, FIG. 6b and recorded in the system data base 116, over the remaining term government rate. This is calculated and inputted into the system data base 116 at step 307, FIG. 6c. At inception that would be 9.75%. This rate represents the maximum rate which could be established in any given year. For instance, if the remaining term government rate declined to 5%, then the annual maximum rate for the year would be 7.75%. This is entered into system 107. Thus, the annual interest on the instrument could be established at rates up to 7.75%. On the other hand, if the remaining term government rate increased to 11%, with the annual maximum rate at 13.75%, the maximum rate cap of 13% would govern, with annual interest established at no greater than 13%.

The insurer borrower 106 and lender 105 then agree on the minimum target rate. Again assume a 50 basis point augmentation to the remaining term government rate, step 308, FIG. 6c. At issuance of the loan agreement instrument 100, that rate would be 7.5%, which is calculated and recorded in the system data base 116 at step 309.

The method of computing the formula rate is then agreed upon with the parameters, being monitored, step 310. For illustration purposes, assume the lender requires all lease revenue, salvage recoveries and interest to be allocated to the purpose account, less the cost of equipment and the insurer's annual expenses up to an annual maximum cap. This data is then entered into the system. In many ways, the agreement acts like a standard loan covenant. Annual net gains are then to be allocated to the computational account. These gains are then subdivided by system 107 within the computational account. For instance, the lender 105 may require the insurer borrower 106 to set aside a sufficient portion of these amounts to permit it to establish the next period's interest crediting rate at no less than the minimum target rate. Any portion above this amount may then be split between amounts allocated to increasing the interest crediting rate, amounts reallocated to the purpose reserve, and amounts allocated to the insurer. All this information is stored in the system 107. In this example, it is assumed that of this remaining portion, the insurer borrower 106 will be permitted to deduct amounts including interest, which it previously advanced for the payment of interest sourced from other than financed activity funds. Thereafter, the remaining portion might be divided as follows: funds representing up to 4% of the current principal and accrued interest balance of the financial instrument 100, reallocated to purpose accounts, at the discretion of the insurer; 75% of the remaining portion attributable to the adjustable yield computation; and the balance subject to allocation to the insurer or reallocation to the purpose accounts 103a, FIGS. 2, 3 and 4 at the discretion of the insurer. The effect of reallocations to the purpose accounts is to increase the collateral and earnings support for the loan. In the event insufficient amounts are allocated to the computational account to allow it to establish at least the minimum target rate, the insurer agrees to reallocate amounts from the purpose account, subject to maximum draw down amount or provide additional amounts from other revenue sources or liquidation of a portion of its capital assets, all as agreed with the lender. This is then entered into the system 107.

Finally, the insurer 106 and lender 105 agree to the acceleration option, step 312, FIG. 6d. For illustration purposes, it is assumed the lender requires a minimum yield of 250 basis points over the remaining term government rate for each year the instrument 100 is outstanding, and that it may only be accelerated on December 31 of each year as stored in the system 107.

The above information is inputted into the data processing system 127 through an appropriate input device and stored in the system's database 116, FIG. 1. The system 107 then creates on the books of the insurer borrower 106, in the system 107, the following described accounts, FIG. 6d, step 314, generating regulating subsystem registers in the reservoir subsystem 130, making various computations and creating initial balances for each account, step 320, FIG. 6f.

Upon creation of the balance account 110a, the system 107 establishes its opening balance at $1,000,000.

The system 107 then allocates an opening balance of $1,000,000 to the computational account 104a at temporary registers 104, FIG. 6d. Accessing a current government securities interest rate matrix stored within data base 116 of the system, FIG. 1. System 107 determines the appropriate discounting interest rates at update module 126, FIG. 1, and terms based on the payment dates established for repayment of principal and payment of the initial interest component and the minimum interest component. To illustrate, it is assumed the one year government securities rate is 5% and the 20 year rate is 7%. The system 107 then computes the discounted value of these required payments in a three step process:

a) the principal component of $1,000,000 is discounted for 20 years at 7% producing a discounted present value of approximately $258,419, step 322, FIG. 6f, after copying the initial inflow data and the outflow dates, step 321;

b) the initial period interest rate is 8%, producing a first year interest payment in 12 months of $80,000 ($1,000,000×8%), which when discounted at the one year government securities rate of 5%, results in a discounted value of approximately $76,190, step 324; and c) the minimum interest component to be paid at maturity is computed by compounding the principal component for 20 years at the minimum interest rate (4%) resulting in a future value of approximately $2,191,123, from which is deducted the principal component of $1,000,000, leaving the minimum interest component of $1,191,123, which is then discounted at the 20 year government securities rate (7%) to produce a present value of approximately $307,809, step 323, FIG. 6f.

Taken together the present value of the repayment of principal, initial period interest and minimum interest is approximately $642,418. These individual amounts are deducted from the computational account 104a and allocated to the payment account 102a, step 327, FIG. 6g.

The system then creates a purpose account 103a (FIG. 2) for the purpose of reserving future custodial, professional, and administrative costs. An annual basis point adjustment entered into the system 107 is determined and applied against a projection of outstanding instrument balances from the balance account 101a, step 325, FIG. 6g. These amounts are then discounted to a present value basis based on the long-term government securities rate or other method. This present value amount is then deducted from the computational account and allocated to the administrative purpose account 103a, FIG. 2, step 326, FIG. 6g.

Any transactional costs, including intermediary and investment banking fees, legal fees, rating agency costs, certification expenses, and other acquisition costs are then entered and deducted from the computational account, step 328.

Finally, the remaining computational account balance is allocated based on data in the temporary registers 104 to one or more purpose accounts 103a, FIG. 2, at step 330, FIG. 6h, in the reservoir subsystem 130. Specific risk taking and investment objectives, parameters, and restrictions are established for each account, step 329, and supplied to system data base 116.

Annual Servicing

Figure 7A:
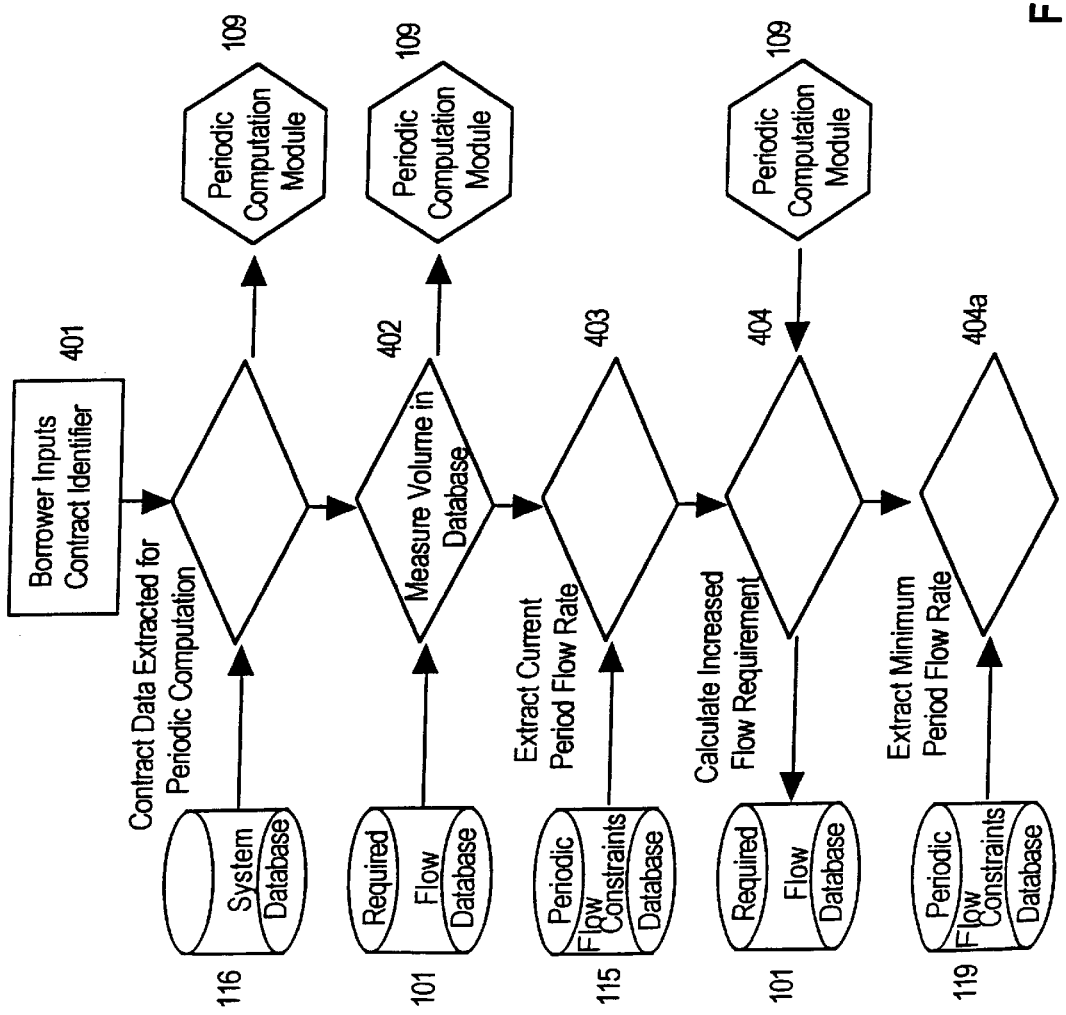
FIGS. 7a–7g are flow diagrams showing the periodic computation of compensation flow and financial accounts phase of the system.

FIG. 2 shows a flow chart adaptable to data processing for servicing the various accounts, step 401, FIG. 7a.

In establishing the first year's computations, the system 107 begins with the balance account 101a. From the date of issuance of the financial instrument 100, it determines, step 402, FIG. 7a, the amount of interest to be added to the balance account 111a, taking into consideration the original balance allocated, computed at the initial interest rate, step 403, for the period from issuance to interest crediting date, step 404. This amount is added to the balance account, arriving at a new financial instrument 100 balance. The minimum period flow rate is extracted from the periodic flow constraints database at step 404a. The system performs the same computation on the original balance, substituting the minimum interest rate for the initial interest rate (1) at step 405, FIG. 7a. Under the example, the difference between these two results is the amount to be paid on the interest crediting date by the insurer, step 407, FIG. 7b. Some instruments 100 may be issued with other interest payment and deferral terms, which the system 107 computes and tracks. The original principal balance plus any accrued, unpaid interest on the interest crediting date is the new financial instrument 100 balance, step 406. Each year thereafter is computed in a similar manner, substituting the initial period interest rate (after the initial interest period) with the rate established at the beginning of the year by the insurer.

Figure 7B:
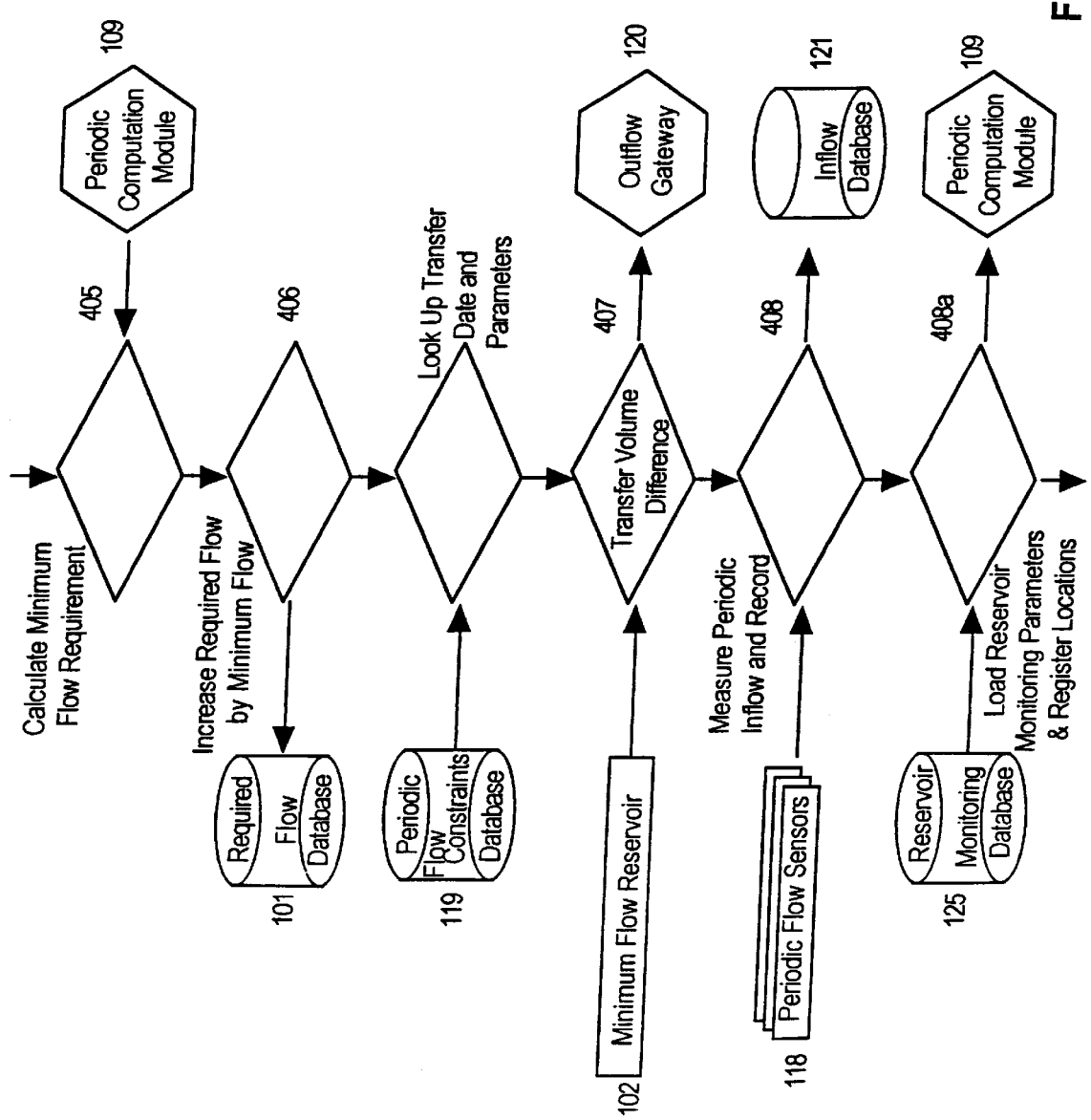
Figure 7C:
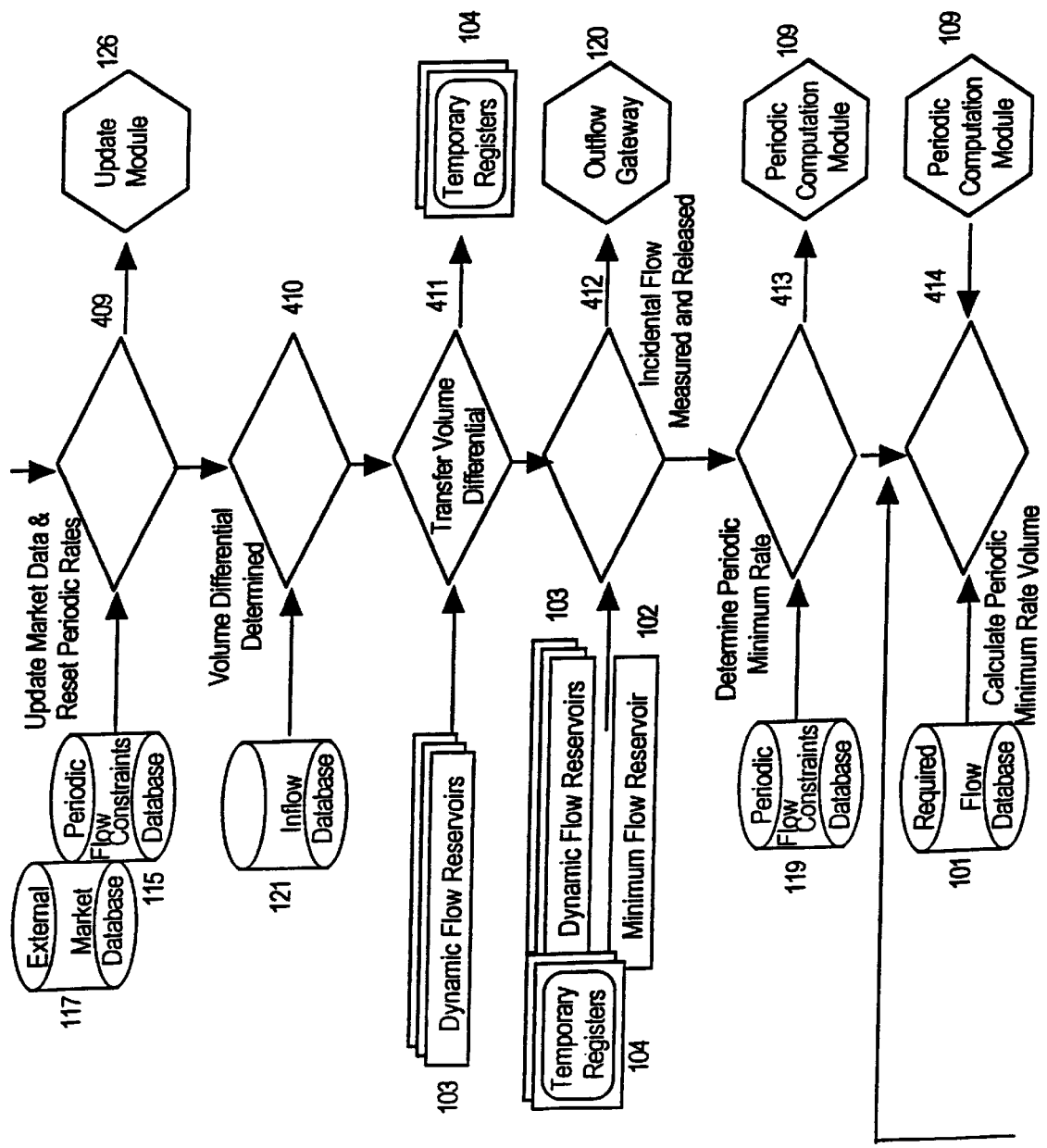
Figure 7D:
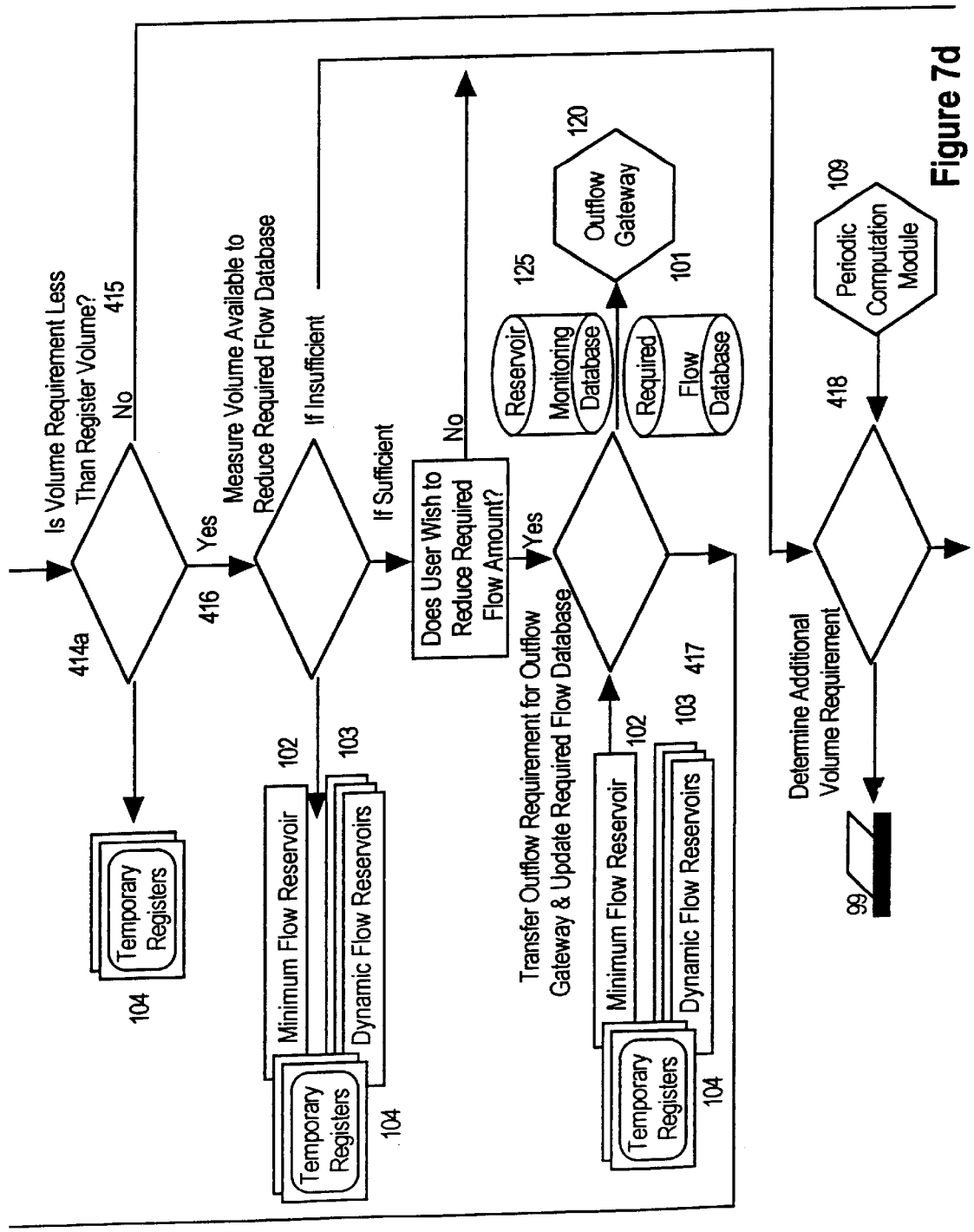
Figure 7E:
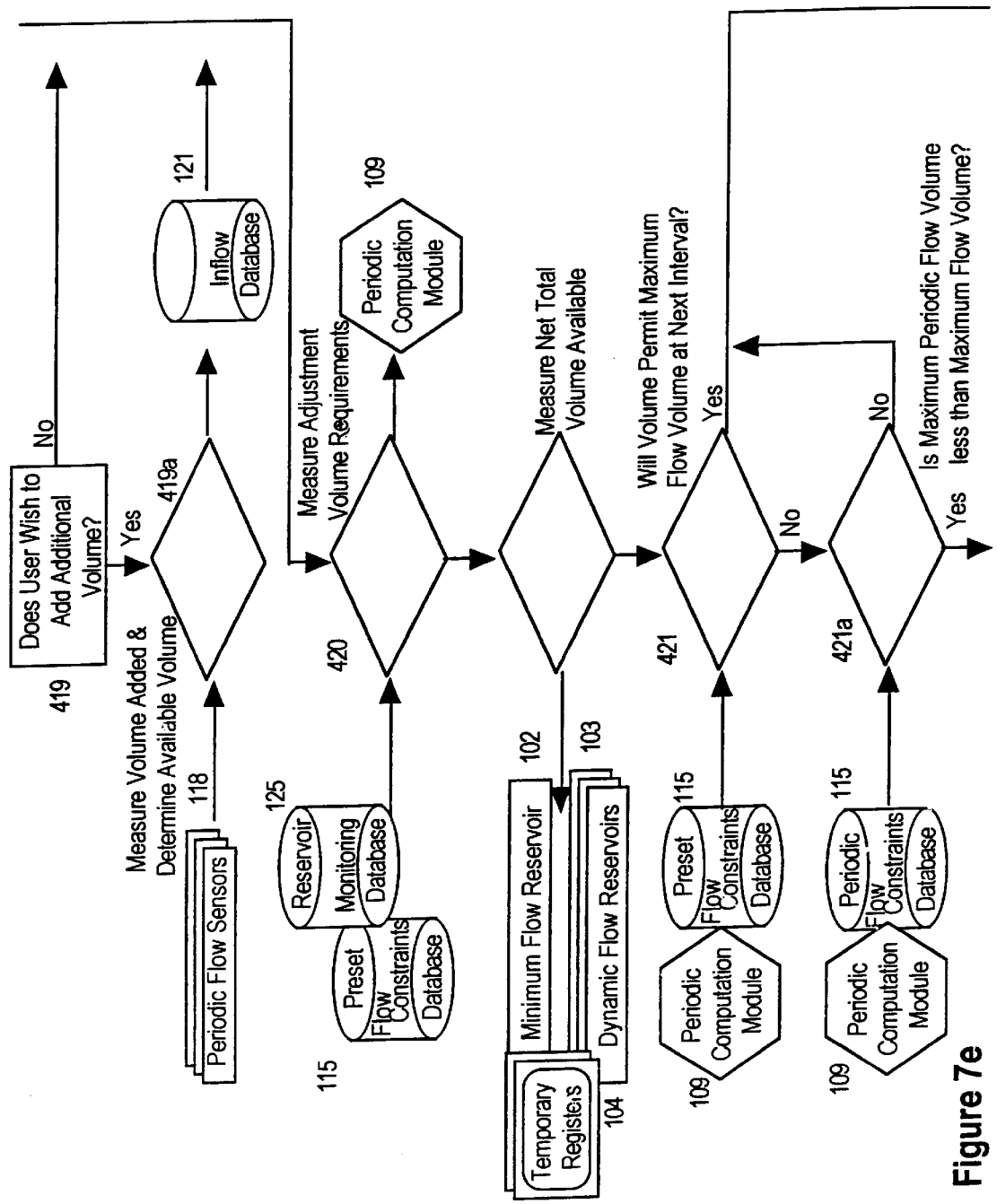

On each interest computation date, the system determines the balance of all purpose accounts 103a and step 408, FIG. 7b, loading the reservoir monitoring parameters & register locations at step 408a, updates the market data and reset the periodic rates at step 409, less the respective balances from the previous year (2) using the periodic sensors 118, FIG. 1, at step 410, FIG. 7c. The administrative purpose account is not included in these computations. The difference in these amounts is then allocated by the system 107 to the computational account 104a in step 411, reducing the balances in the respective purpose accounts to their previous year's balance. The balance in the administrative purpose account may be reduced by a predetermined amount representing annual fiduciary, custodial and administrative expenses at step 412.

On each interest computation date, the system 107 determines the minimum target rate, step 413, FIG. 7c, then calculates the amount of interest necessary to distribute this rate, less the minimum interest rate if appropriate, on the interest crediting date subsequent to the next interest crediting date, step 414. Then it is determined if the volume requirement is less than the register volume at step 414a, FIG. 7d. This amount is then discounted by an appropriate government securities rate for the computed term, to determine the present value the insurer must set aside to be able to establish the minimum target rate on the next interest crediting date, and pay the said interest, less accrued minimum interest if applicable, on the next subsequent interest crediting date (3).

From the amount allocated to the computational account on the interest computation date, the system 107 then deducts this present value result. If funds remain, step 415, FIG. 7c, then the system 107 applies various allocations of any remaining amounts. If the insurer borrower had previously advanced funds into the accounts to make up prior year's shortfalls as entered into system 107, it could recover some of these amounts at its discretion. Using the terms of the example, the system 107 would then deduct 4% of the projected balance in the balance account on the next interest crediting date. Any remaining amount would then be reduced by 25% allocated out of the accounts as directed by the insurer, or reallocated to the purpose accounts at its discretion. All remaining amounts, including any further contractual adjustments, would be divided into the financial instrument balance on the next interest crediting date to determine the formula rate. All of the above steps are entered into the system and processed by the system 107.

Figure 7F:
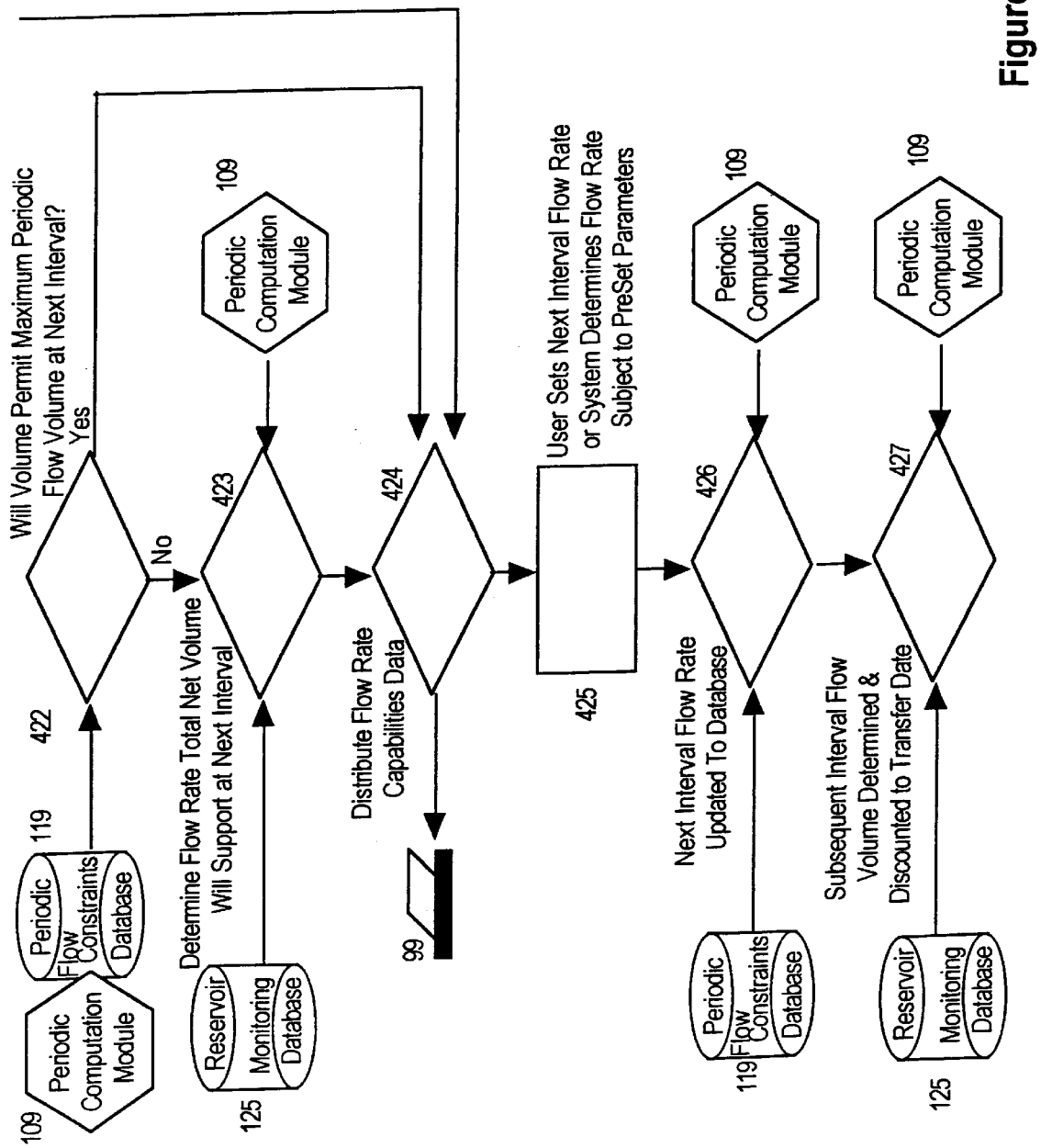

Based on contractual information retained in the database 119, FIG. 1, the system 107 then uses the previously agreed basis point modifier matched to the current interest rate matrix, as entered into the system to compute the maximum annual interest rate, step 422, FIG. 7f. It then provides the insurer a report 100$_2$, step 424, on this particular financial instrument 100 containing the: maximum rate cap, determined at step 423, maximum annual interest rate, formula rate determined at step 423, minimum target rate, and minimum interest rate. From this information the insurer then determines the interest rate to be established on the next interest crediting date at step 425 and entered into the system.

Figure 7G:
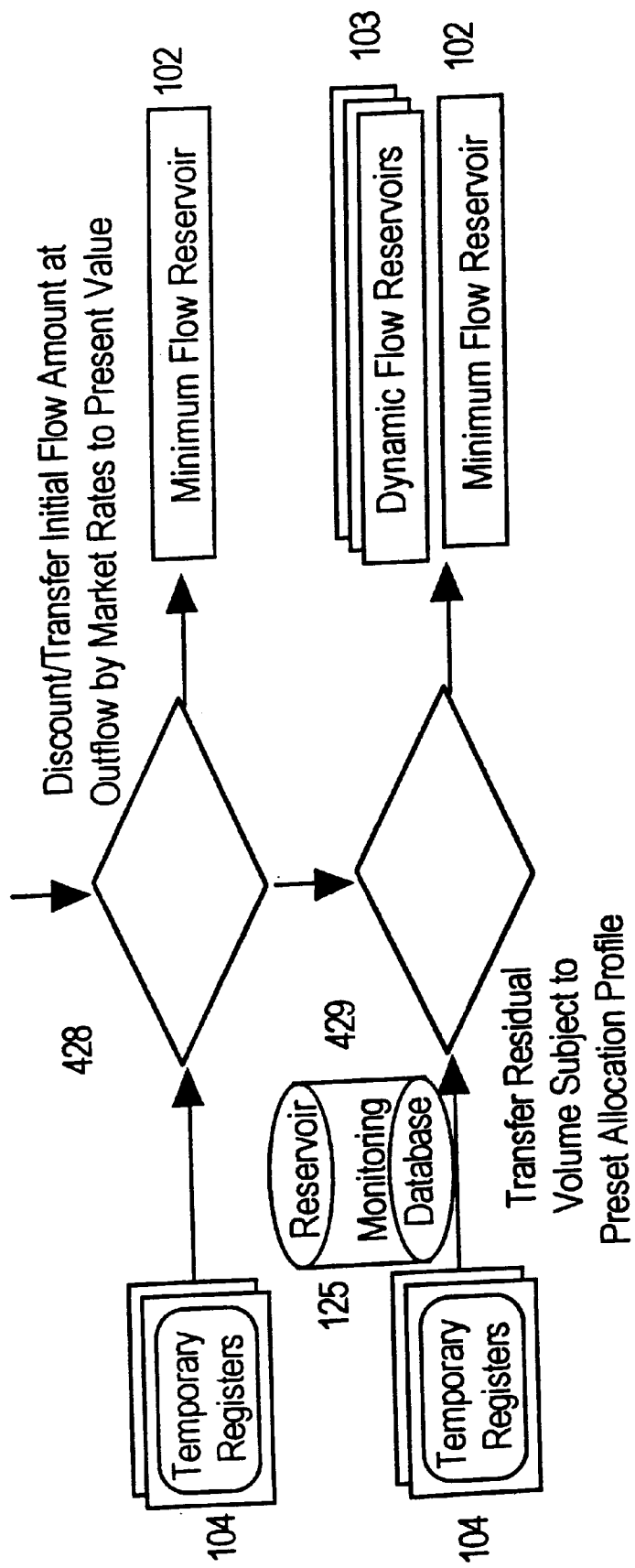

Once the new interest crediting rate is determined and input in the system 107, the system 107 reviews the amounts allocated to the computational account 104*a* and its previous computations within the computational account. It multiplies the newly determined interest crediting rate by the projected financial instrument balance for the next interest crediting date. It then computes the amount of interest to be paid on the subsequent interest crediting date by deducting any accrued minimum interest at step 426. This resulting interest payment amount is then discounted at step 427 at an appropriate government securities rate determined from the current interest rate matrix for the intervening period to arrive at a present value mount to be allocated from the computational account to the payment account at step 428, FIG. 7*g*, which amount represents the present value of the discretionary excess interest for the subsequent period.

If the amount allocated to the computational account is less than this present value amount, as determined at step 416, FIG. 7*c*, the system 107 determines the difference at step 418, FIG. 7*c*, then requests information from the insurer as to whether these amounts will be allocated from a different source and be added to notional insurer advance balance, step 419; or will be allocated from purpose accounts, and to what extent such allocations will be made within the various purpose accounts, step 419*a*. Once determined, these allocations are made to the computational account at step 420 by system 107.

If the amount allocated to the computational account 104*a* is greater than the present value amount (FIG. 3), the system 107 then reallocates the remaining amounts to the purpose accounts or deducts them from the account as previously agreed. At the end of the computational process the balance of the computational account is returned to zero at step 429, FIG. 7*g*, by system 107.

Finally, within the payment account, the system 107 subdivides accreting balances between principal, minimum interest, and additional adjustable interest. Initially, the present value of the principal balance is ascribed to the principal subaccount, the present value of minimum interest to the minimum interest subaccount, and the present value of initial period interest to the adjustable interest subaccount. On each interest crediting date, these accounts are increased by the respective compounding rate established at issuance of the contract, which information is maintained in the system database. Annually, the system 107 allocates from the computational account to the adjustable interest subaccount, the present value amount of the adjustable interest for the coming year, along with a compounding rate for said amount being added to the system database. On the interest crediting date, the system allocates 107 payments of interest to the contractholder from the payment account's adjustable interest subaccount using the outflow gateway, FIG. 1, at step 407. If minimum interest is paid annually, the system 107 indicates, FIG. 7*b* and 7*c*, it is also annually paid along with adjustable interest as one payment, being deducted from the minimum interest subaccount, step 417.

Otherwise minimum interest accrues until paid along with the principal payment on such date(s) as agreed. These payments are deducted from the minimum interest subaccount and principal subaccount, respectively.

At the end of the annual computational cycle, the balance account will reflect the outstanding liability of the insurer to the lender, being principal and accrued interest. The payment account will reflect the discounted value of determined payment liabilities, being principal, minimum interest, and adjustable interest established for the coming year. The purpose accounts will reflect revised balances, along with the computational account reset to zero.

Acceleration Monitoring

Figure 8:
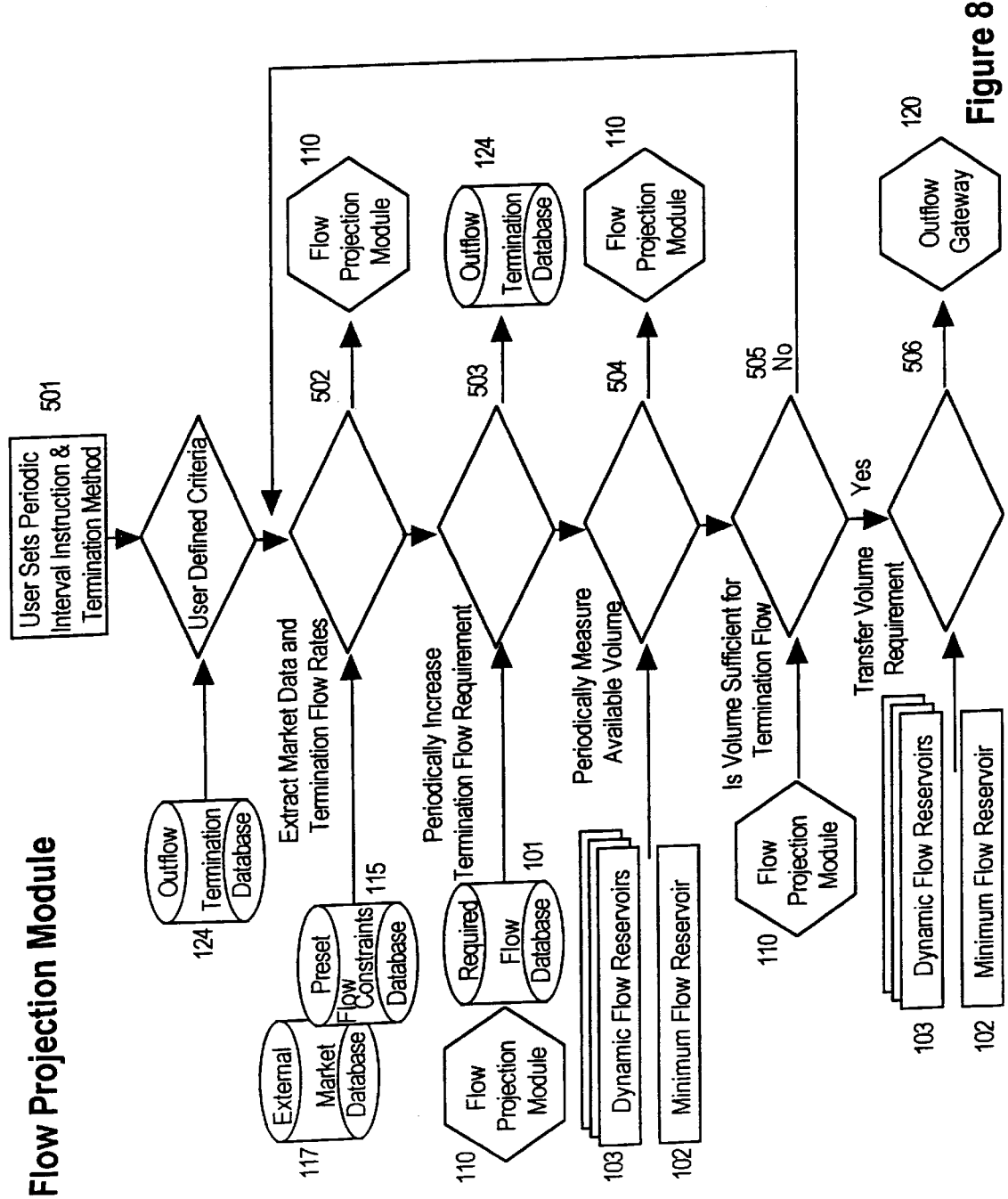
FIG. 8 is a flow diagram showing contract termination.

Data processing capabilities FIG. 8 are supplied step 501 for displaying the effects of changes in current interest rates and increases in purpose accounts on the economics of the financing for the insurer.

This module of the system can provide both projective analysis given various interest rate scenarios, but is most useful in determining the effects of current interest rates on the financing.

On each interest computation date, this module applies current interest rates to the principal balance and minimum interest components as of the dates said amounts are to be paid, discounting them to the interest crediting date. The results are then compared to the current balances in the principal and minimum interest subaccounts of the payment account. If the amount is greater step 505, then the system determines the acceleration method selected at issuance.

In our example, FIG. 4, the lender selected an acceleration "premium" option requiring an annual interest rate of 250 bp over the remaining term government rate. The system determines the remaining term government rate for each year since issuance, then applies the basis point adjustment. It then determines the adjustable rate of interest established for each period. If the composite yield established over the period was less than 250 bp over the remaining term government rate, then the system computes an acceleration "premium" sufficient to bring the composite yield on the instrument for the period of time held to 250 bp over the remaining term government rate step 503.

The current discount result is then combined with the current balance of the purpose accounts. If amounts remain 504 after the system deducts the current balance account and any acceleration premium, it may be beneficial to accelerate the financial instrument. A decision to accelerate, results in a payment of amounts 506 equaling the balance account plus any acceleration premium. The contract terminates and all accounts are allocated to zero, and deleted from the insurer's books of account.

If the limited acceleration option had been selected, a slightly different process is used. After determining the current discounted amount to be greater than the amounts allocated within the payment account, the system computes the effect of acceleration of the maximum amount permitted. For example, if 80% of the financial instrument could be accelerated, then the system would reduce the balance account by 80%. It would then reduce the respective subaccounts of the payment account by 80%. Of the excess computed from the difference between current rate discounting of final amounts and the balance of the payment account, 80% would be allocated to the purpose accounts, in a manner determined at issuance of the financial instrument.

This allocation would have the effect of increasing allocations from the purpose accounts to the computational account in future years. The database would contain information as to whether the prior year's original balance would be adjusted by the acceleration allocation on the interest computation date after acceleration, or whether that amount would be included as a part of the gain for the first year after allocation.

Other Aspects of the System

The system also maintains a database with original parameters and restrictions for the allocation of amount within the purpose accounts processed through the initial flow sensors 114.

Figure 5A:
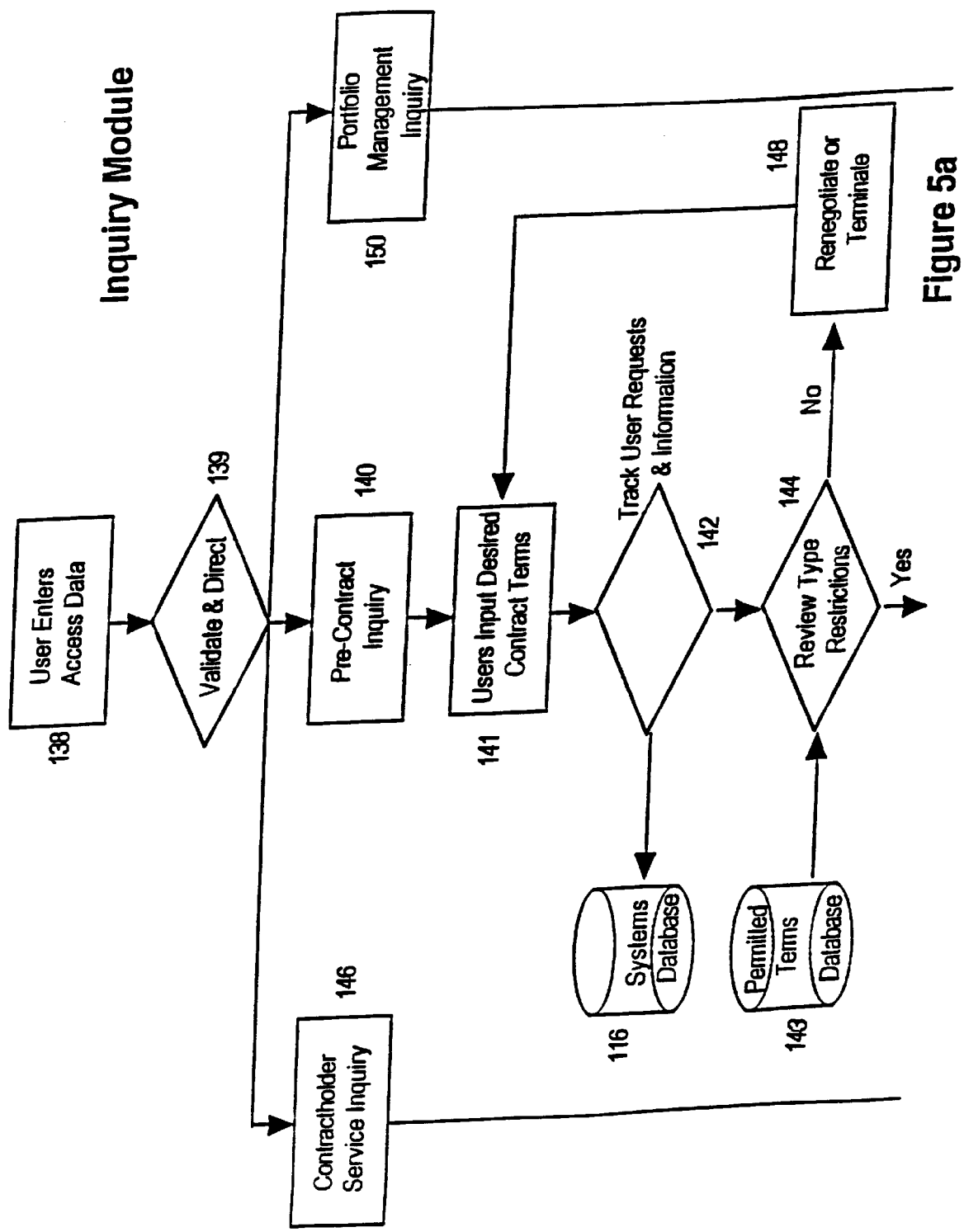
FIGS. 5a, 5b and 5c are flow diagrams showing the inquiry phase of the system.
Figure 5B:
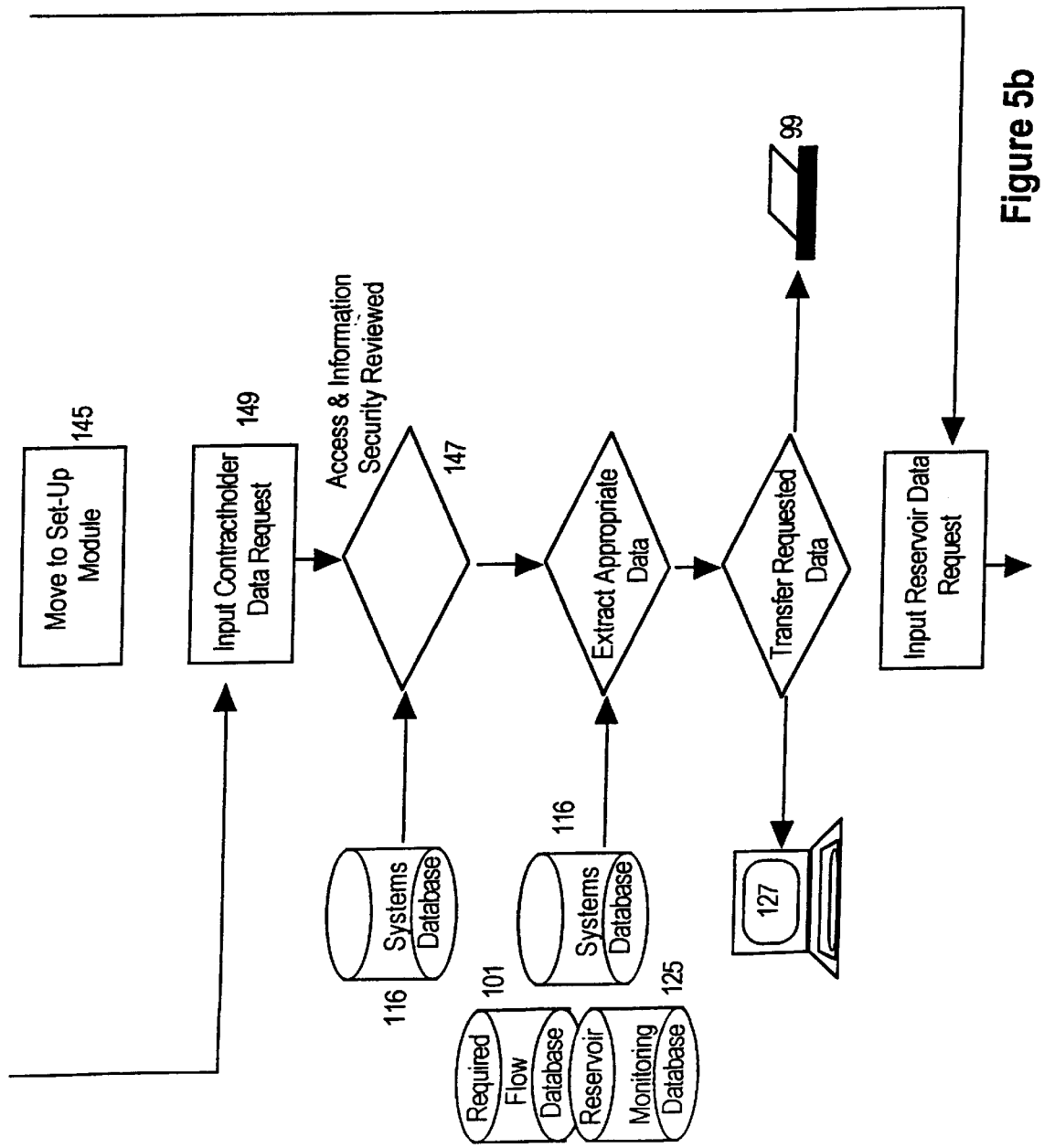
Figure 5C:
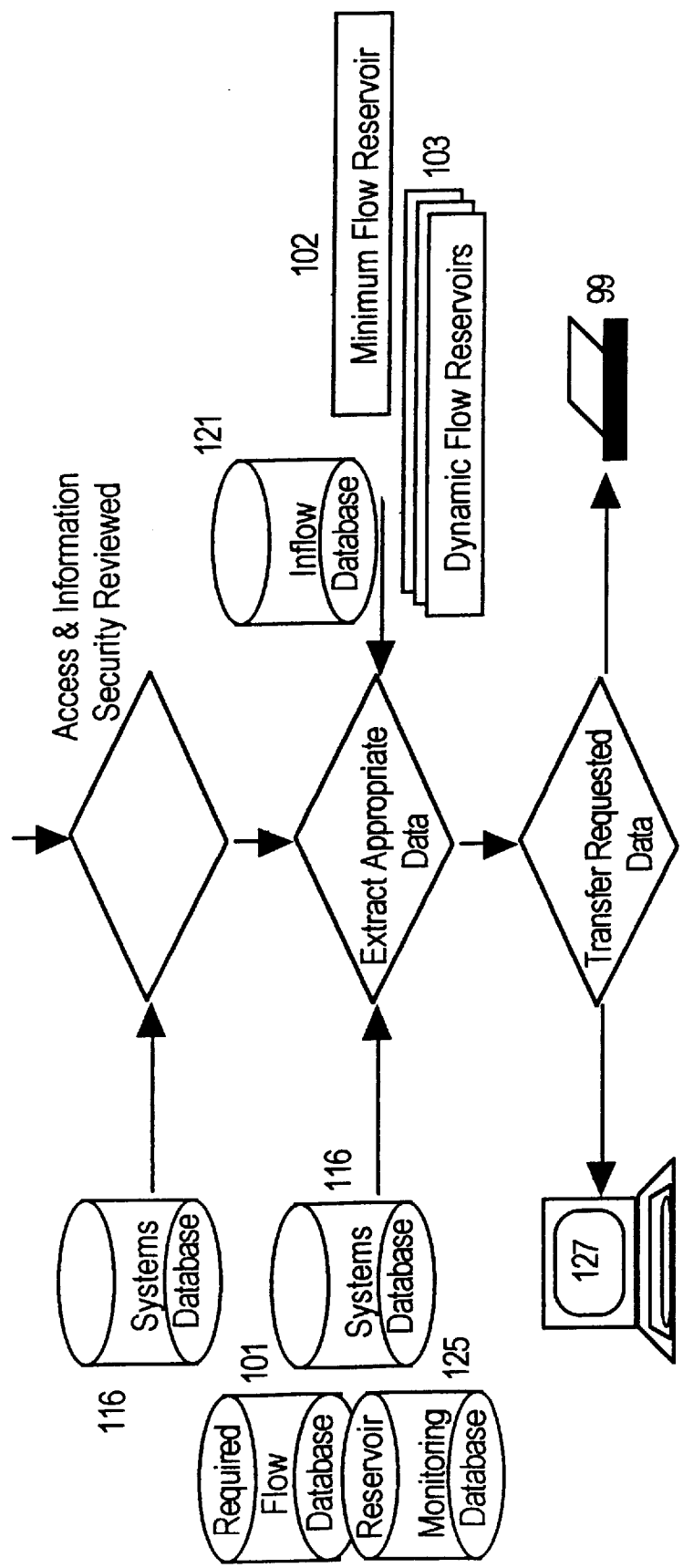

Amounts ascribed to any particular activity are tracked, along with allocations made to various investment managers, risk taking professionals, custodians, fiduciary accounts, etc., such information accessible through the inquiry module 146, FIG. 5*a*.

The system also tracks agreed fee levels, computing and deducting these amounts from the purpose accounts, or other accounts as appropriate.

It permits the borrower to obtain long-term financing and partially establish interest payments based on the results of its financed activities. It further assures parties providing funds to the borrower of a guaranteed return of principal, some minimum rate of interest and an annually adjusted rate of interest partially determined by current market rates and the results of the borrowers financed activities.

The invention also enhances the borrowing entity's ability to augment debt repayment through market interest rate movements. The system projects the effects of interest rate movements on the underlying value of the borrowing entity's assets identified to the financing. If such asset value increase significantly, the borrowing entity may elect to liquidate some, or all of such assets, repaying the debt early (steps 416, 417, FIG. 7*c*).

The means used for accomplishing the steps of the present methods and for operating the present system are those currently available to industry including telephones, computer networks, calculators, tickler systems, face-to-face negotiations, accounting techniques and computer processors of words and other data.

Portfolio management is the function of investing monies assigned to the payment accounts and subaccounts and purpose accounts to meet agreed-to investment objectives. For example, funds or proceeds allotted to payment accounts are invested in high grade bonds to assure minimum commitments of compensation while monies in purpose accounts are, within the scope of guidelines and restrictions of the financial contract, invested to obtain higher yields including yields above the return expected of U.S. government bonds. Portfolio management information is electronically available through inquiry module at 150, FIGS. 5*a* and 5*b*, in print or video display form.

One skilled in the art will appreciate that the present invention can be practiced by other than the embodiments described, which are presented for purposes of illustration and not of limitation, and the present invention is limited only by the claims that follow.

The foregoing invention has been described in terms of the preferred embodiments. However, those of skill in the art will recognize that many variations of such embodiments exist. Such variations are intended to be within the scope of the present invention and the appended claims.

What is claimed is:

1. A computer-based system employing operatively interconnected data processing and computing means for creating, servicing and paying in financial contracts having terms and conditions which provide repayment of monies tendered by one entity to another on a date or dates in the future, along with periodically provided compensation thereon, said system comprising:

means for inputting and storing into at least one electronic database, which includes one or more accounts, the negotiated terms and conditions of a financial contract with an identified lender which provides for the level of compensation thereon to be adjusted periodically to produce a rate of compensation tied to an external benchmark, allowing the issuing entity to establish a lower rate of compensation in any period in which its solvency or deteriorating credit quality, including with respect to the business activity to which the contract relates, is otherwise threatened in exchange for establishment of a higher rate of compensation during periods in which the results of a formula computation exceed certain pre-agreed levels; and means accessible to at least one electronic database for issuing and displaying the financial contract and terms thereof with constraints comprising the agreed terms and conditions.

2. The computer-based system of claim 1, comprising restriction means coupled to said at least one electronic database for identifying a particular business activity, agreeing, recording and communicating the terms under which funds received from the issuance of the financial contract(s) will be used by the issuing entity.

3. The computer-based system of claim 1, comprising account establishing means coupled to said at least one electronic database for creating one or more accounts for the purpose of allocating the financial results of the issuing entity's business activities identified to the financial contract (s) and initially establishing and periodically determining its obligations to contractholder(s) and service providers.

4. The computer-based system of claim 1, comprising entering means coupled to said at least one electronic database for recording and storing contract purchase, contract terms and conditions, payment information, current interest rate matrix, compensation and paying information, acceleration notice provisions, and other contract information and contractholder inquiries.

5. The computer-based system of claim 1, comprising asset position list means coupled to said at least one electronic database for recording and storing an asset position list of current balance information concerning application of contract proceeds.

6. The computer-based system of claim 1, comprising reporting means coupled to said at least one electronic database for generating and displaying detail and summary data on initial terms of the financial contract(s) and the initial status of the issuing entity's assets and its contractual obligations to the contractholder through print or electronic display means.

7. The computer-based system of claim 1, comprising account list means coupled said at least one electronic database for recording and storing an account list of current balance information for each financial contract, account information and the accounts into which said issuing means has issued a financial contract.

8. The computer-based system of claim 1, comprising means coupled to said at least one electronic database for establishing and entering the amount and currency of the contract proceeds transferred to the issuing entity, the maturity date of the financial contract, the initial compensation period, the rate of compensation during the initial compensation period, the currency in which the financial contract is denominated, the contract proceeds currency exchange rate if applicable, compensation periods, dates and terms under which periodic compensation will be accrued and paid, specific rate parameters and procedure for determining periodic compensation, prepayment provisions, account drawdown provisions, payment procedures, and such other information as the issuing entity and contractholder(s) may agree.

9. The computer-based system of claim 1, comprising means coupled to said at least one electronic database for issuing electronically or in print form the financial instrument as a debt obligation, an annuity contract, a guaranteed investment contract, a certificate of deposit, a note, a swap contract, or other form of financial instrument.

10. The computer-based system of claim 1, comprising means coupled to said at least one electronic database for issuing the financial instrument where the issuing entity is selected from the group consisting of an insurance company, bank, single purpose corporation, governmental issuer or affiliate, individual, trust, mutual fund, investment company, partnership, limited partnership, or other incorporated or unincorporated entity.

11. The computer-based system of claim 1, comprising contract negotiation means coupled to said at least one electronic database for the issuing entity and one or more contractholders to enter and negotiate through computer assisted means, which may include the use of intermediaries and service providers, the terms of financial contract(s) which provide for the level of compensation thereon to be adjusted periodically to produce a rate of compensation tied to an external benchmark, allowing the paying entity to establish a lower rate of compensation in any period in which its solvency or deteriorating credit quality, including with respect to the business activity to which the contract relates, is otherwise threatened in exchange for establishment of a higher rate of compensation during periods in which the results of a formula computation exceed certain pre-agreed levels.

12. The computer-based system of claim 11 of contract negotiation means, comprising:
means coupled to said at least one electronic database for recording and storing proposed contract terms, which may include the proposed date of transfer and amount to be tendered by prospective contractholder(s) to the issuing entity, the proposed amounts and dates of repayment by the issuing entity of such tendered amounts, the dates and method of determining payments of periodic compensation to contractholder(s) by issuing entity, any restriction(s) on use of contract proceeds, initial compensation period and rate of compensation, minimum rates of compensation, maximum rates of compensation, interest rate crediting parameters and formula computation methods, prepayment terms, and other proposed contract terms; and
means for communicating such proposed contract terms and other information between issuing entity, prospective contractholders, intermediaries and service providers by print means, video display means, or other electronic communication means.

13. The computer-based system of claim 1, comprising proceeds application means coupled to said at least one electronic database for selecting a portfolio of securities and/or application of contract proceeds to other business purposes.

14. The computer-based system of claim 13, comprising:
means coupled to said at least one electronic database for identifying, recording, storing and communicating the specific investments, investment activities, or other purposes for which a portion of the contract proceeds are to be used, and the parameters under which the issuing entity will conduct such business activities;
means coupled to said at least one electronic database for establishing investment quality, currency and duration parameters for investment securities allocated to the payment account(s); and
means coupled to said at least one electronic database for restricting the use of profits generated from the investment of contract proceeds allocated to at least one purpose account, to enhance the security and repayment of financial contract obligations, including increasing the level of periodic compensation.

15. The computer-based system of claim 1, comprising recalculation means coupled to said at least one electronic database for determining the inputs based on such terms and conditions for recalculating the periodic compensation.

16. The computer-based system of claim 15, wherein said recalculation means comprises:
means for dividing the adjusted periodic balance of the computational account by the balance on a periodic computation date of the balance account, added to the minimum rate, if such rate is funded with assets allocated to the payment account and such payment account is not insufficient on the date of the periodic computation, said result being the formula rate; and
means for comparing the formula rate to the external benchmark, and other rates which may include a minimum rate, a contract maximum rate, and a maximum rate for the period.

17. The computer-based system of claim 15, further comprising:
means coupled to said at least one electronic database for determining the amount to be allocated to the computational account if the formula rate is less than the external benchmark to permit the issuing entity to establish the compensation crediting rate for the subsequent period at the external benchmark; and
means coupled to said at least one electronic database for determining whether sufficient such amount to be allocated is available for transfer from the purpose accounts or from other assets or revenues of the issuing entity to the extent agreed at issuance of the financial contract, and if not, the amount otherwise available for such transfer.

18. The computer-based system of claim 15, further comprising:
means coupled to said at least one electronic database for establishing the compensation crediting rate at the external benchmark if the formula rate is below the external benchmark and sufficient assets are available for allocation to the computational account;
means coupled to said at least one electronic database for establishing the compensation crediting rate at a level below the external benchmark if assets allocated to the computational account are not sufficient to establish such rate at the external benchmark, such lower rate being determined by computing the percentage at which such available assets would be sufficient to fund compensation for the subsequent period; and
means coupled to said at least one electronic database for establishing the compensation crediting rate above the formula rate if such rate does not exceed any periodic maximum or contract maximum rate, and in the event the formula rate does exceed such maximum rates, establishing the compensation crediting rate for the subsequent period at the lower of such rates.

19. The computer-based system of claim 1, comprising prepayment means coupled to said at least one electronic database for determining, recording and storing at issuance of the financial contract the terms under which the issuing entity could partially or wholly prepay the financial contract during its term.

20. The computer-based system of of claim 19, comprising means coupled to said at least one electronic database for recording and storing periodic dates on which the issuing entity could elect to partially or wholly prepay the financial contract; and means coupled to said at least one electronic database for recording and storing terms and conditions for periodic rate recomputation.

21. The computer-based system of claim 19, comprising means coupled to said at least one electronic database for determining a minimum rate of periodic compensation to be paid to the contractholder if the issuing entity wholly prepays the financial contract prior to maturity.

22. The computer-based system of claim 19, comprising means coupled to said at least one electronic database for determining a portion of the financial contract which may not be prepaid prior to maturity.

23. The computer-based system of claim 1, comprising account allocation means coupled to said at least one electronic database for allocating and entering contract proceeds to various ones of said accounts established at issuance of the financial contract, allocation and entering of the issuing entity's obligations to contractholder(s) to one or more of said accounts, and for determining account balances at issuance of the financial contract.

24. The computer-based system of claim 23, comprising means coupled to said at least one electronic database for creating a balance account to which an initial balance is credited at issuance of said financial contract equal to the amount of proceeds of said financial contract.

25. The computer-based system of claim 23, comprising means coupled to said at least one electronic database for creating a said computational account to which an initial balance is credited at issuance equal to the amount of proceeds of a financial contract.

26. The computer-based system of claim 25, comprising:
  means coupled to said at least one electronic database for allocating from the computational account at issuance of the financial contract amounts payable to intermediaries and service providers;
  means for allocating a portion of the financial contract proceeds to one or more payment accounts; and
  means coupled to said at least one electronic database for allocating part or all of the proceeds to one or more of said purpose accounts.

27. The computer-based system of claim 23, comprising means coupled to said at least one electronic database for creating a payment account to which amounts are periodically credited and payments to contractholder(s) are deducted therefrom.

28. The computer-based system of claim 27, further comprising means coupled to said at least one electronic database for determining the present value at issuance of the financial contract of contract proceeds to be repaid at maturity, based on current interest rates for investment securities.

29. The computer-based system of claim 27, further comprising means coupled to said at least one electronic database for initially allocating investment securities to such payment account which are invested at such current market rates of interest and are sufficient at their respective maturities dates to repay the initial proceeds of the financial contract.

30. The computer-based system of claim 27, further comprising means coupled to said at least one electronic database for determining the present value at issuance of the financial contract of minimum periodic compensation to be paid on one or more periodic compensation payment dates in the future, based on current interest rates for investment securities matching such payment dates.

31. The computer-based system of claim 27, further comprising means coupled to said at least one electronic database for initially allocating investment securities to said payment account which are invested at predetermined rates of interest and are sufficient at their respective maturities dates to pay the minimum rate of periodic compensation on the financial contract on one or more periodic compensation payment dates in the future.

32. The computer-based system of claim 1, comprising rate establishing means coupled to said at least one electronic database for initially establishing and inputting the external benchmark used as a basis to reset periodic compensation of the financial contract, establishing and entering periodic rate parameters, and initially establishing and entering the conditions under which the issuing entity could reduce periodic compensation of the financial contract to a level less than an amount determined by applying the external benchmark.

33. The computer-based system of claim 32 comprising means coupled to said at least one electronic database for establishing an initial compensation period and an initial rate of compensation for such period.

34. The computer-based system of claim 32, comprising means coupled to said at least one electronic database for establishing the external benchmark as the periodic interest rate on government securities of similar term to the financial contract (remaining term government rate).

35. The computer-based system of claim 32, further comprising means coupled to said at least one electronic database for establishing an adjustment factor including basis point adjustment to augment or diminish an externally determined periodic rate, the resultant periodic value being the external benchmark for the purposes of determining periodic compensation under the financial contact.

36. The computer-based system of claim 32, further comprising means coupled to said at least one electronic database for establishing a minimum periodic rate of compensation.

37. The computer-based system of claim 32, comprising means coupled to said at least one electronic database for establishing a conditional maximum rate of compensation during any period by augmenting the external benchmark with a pre-agreed number of basis points (one hundred basis points equalling one percent).

38. The computer-based system of claim 32 further comprising means coupled to said at least one electronic database for establishing a maximum rate of compensation for all periods during the life of the financial contract.

39. The computer-based system of claim 32, further comprising means coupled to said at least one electronic database for determining and inputting into said at least one electronic database inputs to and computational parameters of a formula which guages the solvency and credit quality of the issuing entity's periodic activities with respect to the business activities for which the contract proceeds are dedicated.

40. The computer-based system of claim 32, comprising:
  means coupled to said at least one electronic database for entering, storing, updating and communicating external market rate data used to determine the periodic external benchmark rate; and
  means coupled to said at least one electronic database for entering, storing, updating and communicating the results of the periodic rate formula, and maximum annual compensation rates.

41. The computer-based system of claim 32 comprising means coupled to said at least one electronic database for recording and storing periodic dates for recalculation; and means coupled to said at least one electronic database for recording and storing a procedure for periodic rate recomputation.

42. The computer-based system of claim 41, comprising means coupled to said at least one electronic database for allocating and determining revenues and assets of the issuing entity, other than those assets identified to the financial contract to which its contract proceeds are initially applied, to the establishment and payment of periodic compensation and for inputting such into said at least one electronic database.

43. A computer-based system employing operatively interconnected data processing and computing means for administering and terminating financial contracts having terms and conditions which provide repayment of monies tendered by one entity to another on a date or dates in the future, along with periodically provided compensation thereon, said system comprising:

means for periodically updating at least one electronic database including means for rebalancing financial accounts corresponding to said financial contracts and for periodically establishing a rate of compensation tied to an external benchmark, being diminished during any period in which the issuing entity's solvency is threatened or credit quality, including with respect to the business activity to which the contract relates, is impaired and augmented during periods in which the results of a formula computation exceed certain preagreed levels; and means accessible to at least one electronic database for periodically determining and displaying the status of a selected financial contract relative to termination pursuant to the agreed terms and conditions of the financial contract.

44. The computer-based system of claim 43, comprising date determining means coupled to said at least one electronic database for determining that periodic computation, period ending, payment, and maturity dates have occurred or will occur within a preset number of days.

45. The computer-based system of claim 43, comprising payment establishing means coupled to said at least one electronic database for determining payments to contractholder, intermediaries, and service providers.

46. The computer-based system of claim 43, comprising account transfer means coupled to said at least one electronic database for allocating transfer amounts between the accounts established at said issuance of the financial contract.

47. The computer-based system of claim 43, comprising restriction means coupled to said at least one electronic database for determining allocation of amounts identified to the financial contract are being used by the issuing entity in the identified business activity(ies), consistent with the terms agreed, recorded and communicated at issuance of the financial contract(s).

48. The computer-based system of claim 43, comprising portfolio management means coupled to said at least one electronic database for periodically adjusting a portfolio of securities and updating an asset position list periodically.

49. The computer-based system of claim 43, comprising reporting means coupled to said at least one electronic database for generating detail and summary data on account balances, the value and type of the issuing entity's assets and its contractual obligations to the contractholder.

50. The computer-based system of claim 43, comprising account list means coupled said at least one electronic database for recording, updating and storing the account list of current balance information for each financial contract, account information and the accounts into which said issuing means has issued a financial contract.

51. The computer-based system of claim 43, comprising transaction and inquiry reporting means coupled to said at least one electronic database for confirming individual transactions and responding to inquiries from customers.

52. The computer-based system of claim 43, comprising management reporting means coupled to said at least one electronic database for periodically generating a report including a summary of financial contracts issued, periodic compensation allocations to one or more of said contractholders, payments, asset and liability position, and investment performance.

53. The computer-based system of claim 43, further comprising means coupled to said at least one electronic database to create subaccounts and periodically allocate a portion of amounts allocated to said accounts to such subaccounts.

54. The computer-based system of claim 43, further comprising means coupled to said at least one electronic database including:

portfolio management means for selecting an asset portfolio of securities and for creating and updating an asset position list periodically, based on an amount of cash that is available for investment, current composition of the asset portfolio, projected cash need for the following period, projected compensation liability schedule, and predefined portfolio selection criteria, in order to generate a stream of cash flows from the asset portfolio that will be sufficient to cover in full in a timely manner the contract obligations; and means for recording the selected security purchase and sale transaction data to update the asset position list.

55. The computer-based system of claim 43, further comprising payment and reporting means coupled to said electronic databases responsive to generating and displaying contractholders periodic payments, notices and status reports of their financial contracts electronically and/or in print form.

56. The computer-based system of claim 43, comprising account beginning balance establishing means coupled to said at least one electronic database for determining the balance at the end of the previous period(s) of the accounts used for the purpose of allocating the financial results of the issuing entity's business activities identified to the financial contract(s) and periodically determining its obligations to contractholder(s) and service providers.

57. The computer-based system of claim 56, wherein the account establishing means comprises means coupled to said at least one electronic database for retrieving the previous period ending balance of the balance, payment, and purpose accounts.

58. The computer-based system of claim 43, comprising rate setting means coupled to said at least one electronic database for determining and storing the periodic external benchmark to be used to reset periodic compensation of the financial contract, the rate parameters for the period, and the conditions under which the issuing entity could reduce the periodic compensation of the financial contract to a level less than an amount determined by applying the external benchmark.

59. The computer-based system of claim 58, wherein the rate setting means comprises means coupled to said at least one electronic database for determining the external benchmark rate for a given period of said financial contracts and other rate levels, which may include the maximum compensation rate for the given period, the financial contract maximum rate, and a contract minimum rate.

60. The computer-based system of claim 43, comprising account adjustment means coupled to said at least one electronic database for determining the inputs to the accounts for the current period after calculation of the periodic compensation.

61. The computer-based system of claim 60, comprising means coupled to said at least one electronic database including:
  means for determining the present value of the subsequent period compensation based on the newly established compensation crediting rate;
  means for transferring such amount of the present value from a computational account to a payment account; and
  means for transferring any remaining balance in the computational account to one or more purpose accounts.

62. The computer-based system of claim 43, comprising account ending balance establishing means coupled to said at least one electronic database for determining and storing the balance at the end of the current period of the accounts used for the purpose of allocating the financial results of the issuing entity's business activities identified to the financial contract(s) and periodically determining its obligations to contractholder(s) and service providers.

63. The computer-based system of claim 62, comprising:
  means coupled to said at least one electronic database for reducing the payment account by any payments made to contractholder; and
  means coupled to said at least one electronic database for increasing the balance account by the accrual of compensation based on the compensation crediting rate.

64. The computer-based system of claim 43, comprising prepayment means coupled to said at least one electronic database for determining if conditions exist during a period under which the issuing entity could partially or wholly prepay the financial contract during its term, and means for partially or wholly prepaying such financial contract.

65. The computer-based system of claim 64, comprising means coupled to said at least one electronic database comprising:
  means for retrieving the prepayment parameters of the financial contract;
  means for entering and monitoring and reporting changes in investments, interest rates, inflation rates, profits generated on assets identified to the financial instrument and other criteria and information parameters; and
  means for determining the effects of changes in interest rates and account balances on the economics of the financial contract and the appropriateness of prepaying the financial contract.

66. The computer-based system of claim 65, comprising:
  means coupled to said at least one electronic database for determining a redemption value of assets set aside to assure payment of minimum contract obligations, and the minimum requirement for contract repayment prior to maturity; and
  means coupled to said at least one electronic database for determining the cost to defease or repay said contract liability based on the present value of assets identified to the contract, data concerning investment yields, other costs, and the time period to said payment date, which may include any minimum prepayment amounts.

67. The computer-based system of claim 65, comprising means coupled to said at least one electronic database for determining that a prepayment date is within periodic dates on which the issuing entity can elect to partially or wholly prepay the financial contract.

68. The computer-based system of claim 43, comprising input determination means coupled to said at least one electronic database for determining the inputs to the accounts for a current period prior to calculation of periodic compensation.

69. The computer-based system of claim 58, wherein the input determination means comprises means for determining as of the periodic computation date, after distribution of required payments to one or more contractholderis, the amount of contract proceeds and accrued compensation, if applicable, outstanding to contractholder(s) from issuing entity, such amount being the balance on the periodic computation date of the balance account.

70. The computer-based system of claim 68, wherein said input determination means comprises:
  means coupled to said at least one electronic database for determining the amount of assets allocated to the payment account when compounded to payment date (s) required under the financial contract using rates of compensation accruing on such financial contract sufficient to meet all previously agreed terms of the financial contract; and
  means coupled to said at least one electronic database for determining, if such assets are insufficient, a percentage as it relates to the balance account of the amount necessary to eliminate such shortfall.

71. The computer-based system of claim 68, further comprising means coupled to said at least one electronic database for creating purpose and computational accounts for determining the amount of the periodic increase in assets allocated to said purpose account(s) attributable to the computational account in a respective current period.

72. The computer-based system of claim 71, comprising:
  means coupled to said at least one electronic database for establishing the beginning periodic computational balance;
  means for retrieving adjustment parameter data agreed at issuance of said financial contract; and
  means for determining an adjusted periodic balance of the computational account to be used in determining periodic compensation.

73. A data processing system employing operatively interconnected data processing and computing means for creating, servicing and paying financial contracts having terms and conditions which provide repayment of monies tendered by one entity to another on a date or dates in the future, along with periodically provided compensation thereon, said system comprising:
  means for inputting and storing into at least one electronic database, which may include one or more financial accounts, the negotiated terms and conditions of a financial contract with an identified lender which provides for the level of compensation thereon to be adjusted periodically to produce a rate of compensation tied to an external benchmark, allowing the issuing entity to establish a lower rate of compensation in any period in which its solvency or deteriorating credit quality, including with respect to the business activity to which the contract relates, is otherwise threatened in exchange for establishment of a higher rate of compensation during periods in which the results of a formula computation exceed certain preagreed levels;
  means accessible to at least one electronic database for issuing and displaying the financial contract and terms thereof with constraints comprising the agreed terms and conditions;
  means for periodically updating at least one electronic database including rebalancing financial accounts coupled to financial contracts and periodically establishing a rate of compensation tied to an external benchmark; and means accessible to at least one electronic database for periodically determining and displaying the status of the financial contract as to termination pursuant to the agreed terms and conditions of the financial contract.

74. The data processing system of claim 73, comprising:

means coupled to said at least one electronic database for entering and identifying a particular business activity and for entering an agreement to the terms under which funds received from the issuance of the financial contract(s) will be used by the issuing entity; and means coupled to said at least one electronic database for entering the results of negotiation including means for electronically negotiating between an issuing entity and one or more contractholders, the terms of financial contract(s) which provide for the level of compensation thereon to be adjusted periodically to produce a rate of compensation tied to an external benchmark, allowing the paying entity to establish a lower rate of compensation in any period in which its solvency or deteriorating credit quality is otherwise threatened in exchange for establishment of a higher rate of compensation during periods in which the results of a formula computation exceed certain pre-agreed levels.

75. The data Processing system of claim 73, comprising:

means coupled to said at least one electronic database for the issuing entity to create and enter one or more accounts for the purpose of allocating the financial results of its business activities identified to the financial contract (s);

means coupled to said at least one electronic database for the issuing entity to create and enter one or more accounts for the purpose of initially establishing and periodically determining its obligations to contractholder(s) and service providers; and memory means coupled to said at least one electronic database for storing information pertaining to each said account.

76. The data processing system of claim 73, comprising means coupled to said at least one electronic database for initially establishing and periodically updating the external benchmark used to establish periodic compensation of the financial contract.

77. The data processing system of claim 73, comprising means coupled to said at least one electronic database for initially establishing the conditions under which the issuing entity could reduce periodic compensation of the financial contract to a level less than an amount determined by applying the external benchmark.

78. The data processing system of claim 73, comprising means coupled to said at least one electronic database for the issuing entity to periodically establish the level of compensation of the financial contract to the contractholder(s) for each respective period.

79. The data processing system of claim 73, comprising:

means coupled to said at least one electronic database for entering and storing the terms under which the issuing entity could partially or wholly prepay the financial contract; and means coupled to said at least one electronic database for determining in a given period that conditions exist which permit the issuing entity to partially or completely prepay the financial contract.

80. The data processing system of claim 73, comprising means coupled to said at least one electronic database including:

investment management means for selecting an asset portfolio of securities and/or application of contract proceeds to other business purposes, and periodically updating said asset allocation accounts; and reporting means for generating detail and summary data on the current status of the issuing entity's assets and its contractual obligations to the contractholder.

81. A method of creating, servicing and paying financial contracts and operating a plurality of financial accounts connected thereto having terms and conditions which provide repayment of monies tendered by one entity to another on a date or dates in the future, along with periodically provided compensation thereon, for the purpose of protecting the solvency of the issuing entity and providing reasonable compensation to contractholders, said method comprising the steps of:

inputting and storing the negotiated terms and conditions of a financial contract with an identified contractholder into at least one electronic database which terms and conditions provide for the level of compensation on the financial contract to be adjusted periodically to produce a rate of compensation tied to an external benchmark, allowing the issuing entity to establish a lower rate of compensation in any period in which its solvency or deteriorating credit quality, including with respect to the business activity to which the contract relates, is otherwise threatened in exchange for establishment of a higher rate of compensation during periods in which the results of a formula computation exceed certain pre-agreed levels;

issuing the financial contract with the agreed terms and conditions representing constraints comprising the agreed terms and conditions;

creating and maintaining one or more accounts in at least one electronic database to which funds received on the issuance of the financial contract are allocated; and utilizing one or more computers to interact and update said accounts maintained in said memory means and report the data contained therein.

82. The method of claim 81, further comprising the steps of:

entering, storing, updating and communicating by electronic means external market rate data used to determine the periodic external benchmark rate; and entering, storing, updating and communicating by electronic means the results of periodic rate formula, and maximum annual compensation rates.

83. A financial contract produced by the practice of the method of claim 81.

84. The method of claim 81, further comprising the steps of:

allocating by computer processing means contract proceeds to various accounts established at issuance of the financial contract, allocation of the issuing entity's obligations to contractholder(s) to one or more accounts, and determining account balances at issuance of the financial contract;

selecting and entering a portfolio of securities and/or application of contract proceeds to other business purposes into said at least one electronic database;

recording and storing an asset position list in said at least one electronic database of current balance information concerning application of contract proceeds;

generating detail and summary data by computer means on initial terms of the financial contract(s) and the initial status of the issuing entity's assets and its contractual obligations to the contractholder; and recording and storing by memory means an account list of current balance information for each financial contract, account information and the accounts corresponding to the financial contract.

85. The method of allocating assets of claim 84, further comprising the steps of:

identifying, recording, storing and communicating by computer processing means the specific investments, investment activities, or other purposes for which a portion of the contract proceeds are to be used, and the parameters under which the issuing entity will conduct such business activities;

establishing, entering and storing in memory means investment quality, currency and duration parameters for investment securities allocated to the payment account(s); and restricting through computer processing means the use of profits generated from the investment of contract proceeds allocated to purpose accounts, to enhance the security and repayment of financial contract obligations, including increasing the level of periodic compensation.

86. The method of allocating assets at issuance of claim 84, comprising the steps of:

creating in said at least one electronic database a balance account to which an initial balance is credited at issuance equal to the amount of contract proceeds;

creating in said at least one electronic database a computational account to which an initial balance is credited at issuance equal to the amount of contract proceeds;

creating in said at least one electronic database a payment account to which amounts are periodically credited and payments to contractholder(s) are deducted therefrom;

allocating by computer processing means from the computational account at issuance amounts payable to intermediaries and service providers;

allocating by computer processing means a portion of contract proceeds to the payment account; and allocating by computer processing means part or all of contract proceeds to one or more purpose accounts.

87. The method of creating a payment account of claim 86, further comprising the steps of:

determining through computer processing means the present value at issuance of contract proceeds to be repaid at maturity, based on current interest rates for investment securities; and allocating by computer processing means investment securities to such payment account which are invested at such current market rates of interest and are sufficient at their respective maturities dates to repay the initial contract proceeds of the financial contract.

88. The method of claim 87, further comprising the steps of:

determining through computer processing means the present value at issuance of minimum periodic compensation to be paid on one or more periodic compensation payment dates in the futures, based on current interest rates for investment securities matching such payment date(s); and initially allocating by computer processing means investment securities to such payment account which are invested at predetermined rates of interest and are sufficient at their respective maturities dates to pay the minimum rate of periodic compensation on the financial contract on one or more periodic compensation payment dates in the future.

89. The method of claim 81, comprising the steps of:

contract negotiation between the issuing entity and one or more contractholders to negotiate, which may include the use of intermediaries and service providers through electronic means, the terms of financial contracts;

identifying a particular business activity, recording into said at least one electronic database and communicating through electronic or print means the terms under which funds received from the issuance of the financial contract (s) will be used by the issuing entity;

creating one or more accounts within said at least one electronic database for the purpose of allocating the financial results of the issuing entity's business activities identified to the financial contract(s) and initially establishing and periodically determining through computer means its obligations to contractholder(s) and service providers;

initially establishing and storing by memory means the external benchmark used as a basis to reset periodic compensation of the financial contract, establishing through computer means the periodic rate parameters, and initially establishing and storing by memory means the conditions under which the issuing entity could reduce periodic compensation of the financial contract to a level less than an amount determined by applying the external benchmark;

determining by processing means the inputs based on such terms and conditions for recalculating the periodic compensation;

determining, recording and storing in said at least one electronic database at issuance the terms under which the issuing entity could partially or wholly prepay the financial contract during its term;

recording and storing in said at least one electronic database contract purchase, contract terms and conditions, payment information, current interest rate matrix, compensation and paying information, acceleration notice provisions, and other contract information and contractholder inquiries; and preparing and issuing through computer assisted print means financial contracts which provide compensation periodically determined by the issuing entity.

90. The method of claim 89 comprising the steps of:

recording and storing proposed contract terms, which may include the proposed date of transfer and amount to be tendered by prospective contractholder(s) to the issuing entity, the proposed amounts and dates of repayment by the issuing entity of such tendered amounts, the dates and method of determining payments of periodic compensation to contractholder(s) by issuing entity, any restriction(s) on use of contract proceeds, initial compensation period and rate of compensation, minimum rates of compensation, maximum rates of compensation, interest rate crediting parameters and formula computation methods, prepayment terms, and other proposed contract terms; and communicating such proposed contract terms and other information between issuing entity, prospective contractholders, intermediaries and service providers.

91. The method of claim 89 of establishing accounts, further comprising the step of creating a plurality of accounts in said at least one electronic database coupled to a financial contract which may include one or more balance, payment, purpose and computational accounts.

92. The method of establishing recalculation terms and conditions of claim 89, comprising the steps of:

recording and storing in said at least one electronic database periodic dates for recalculation; and recording and storing in said at least one electronic database a procedure for periodic rate recomputation;

allocating and determining by computer means revenues and assets of the issuing entity, if any, other than those assets identified to the financial contract to which its contract proceeds are initially applied, to the establishment and payment of periodic compensation.

93. The method of establishing prepayment terms and conditions of claim 89, comprising the steps of:

recording and storing in said at least one electronic database periodic dates on which the issuing entity could elect to partially or wholly prepay the financial contract;

recording and storing in said at least one electronic database terms and conditions for periodic rate recomputation;

determining by computer means a minimum rate of periodic compensation to be paid to the contractholder if the issuing entity wholly prepays the financial contract prior to maturity, if applicable;

determining by computer processing means a portion of the financial contract which may not be prepaid prior to maturity, if applicable.

94. The method of issuing the contract of claim 89, further comprising the steps of:

establishing and storing in said at least one electronic database the amount and currency of the contract proceeds transferred to the issuing entity, the maturity date of the financial contract, the initial compensation period, the rate of compensation during the initial compensation period, the currency in which the financial contract is denominated, the contract proceeds currency exchange rate if applicable, compensation periods, dates and terms under which periodic compensation will be accrued and paid, specific rate parameters and procedure for determining periodic compensation, prepayment provisions, account drawdown provisions, payment procedures, and such other information as the issuing entity and contractholder(s) may agree;

issuing the financial instrument as a debt obligation, an annuity contract, a guaranteed investment contract, a certificate of deposit, a note, a swap contract, or other form of financial instrument; and issuing the financial instrument where the issuing entity is any one of an insurance company, bank, single purpose corporation, individual, trust, mutual fund, investment company, partnership, limited partnership, or other incorporated or unincorporated entity.

95. A financial contract produced by the practice of the method of claim 89.

96. The method of establishing the rates of claim 89, comprising the steps of:

external benchmark as the periodic interest rate on government securities of similar term to the financial contract (remaining term government rate);

entering and storing in said at least one electronic database an adjustment factor including basis point adjustment to augment or diminish an externally determined periodic rate, said resultant periodic value being the external benchmark for the purposes of determining periodic compensation under the financial contact; and entering and storing in said at least one electronic database inputs to and computational parameters of a formula which gauges the solvency and credit quality of the issuing entity's periodic activities with respect to the business activities for which the contract proceeds are dedicated.

97. The method of establishing rates of claim 96, further comprising the steps of:

entering and storing in said at least one electronic database a minimum periodic rate of compensation;

entering and storing in said at least one electronic database a conditional maximum rate of compensation during any specific period by way of augmenting the external benchmark by a pre-agreed number of basis points (one hundred basis points equalling one percent); and entering and storing in said at least one electronic database a maximum rate of compensation for all periods during the life of the financial contract.

98. A method of servicing and paying financial contracts and operating a plurality of financial accounts connected thereto having terms and conditions which provide repayment of monies tendered by one entity to another on a date or dates in the future, along with periodically provided compensation thereon, for the purpose of protecting the solvency of the issuing entity and providing reasonable compensation to contractholders, said method comprising the steps of:

periodically updating at least one electronic database including rebalancing by computer processing means financial accounts coupled to financial contracts and stored in at least one electronic database and periodically establishing a rate of compensation tied to an external benchmark, being diminished during any period in which the issuing entity's solvency is threatened or credit quality, including with respect to the business activity to which the contract relates, is impaired and augmented during periods in which the results of a formula computation exceed certain pre-agreed levels; and means accessible to at least one electronic database for periodically determining and displaying by print or electronic means if the financial contract can be or is subject to termination pursuant to the agreed terms and conditions of the financial contract.

99. A financial contract produced by the practice of the method of claim 98.

100. The method of claim 98, further comprising the step of determining by electronic means coupled to said at least one electronic database if conditions exist during a period under which the issuing entity could partially or wholly prepay the financial contract during its term, and means for partially or wholly prepaying such financial contract.

101. A financial contract produced by the practice of the method of claim 100.

102. The method of claim 100, further comprising the steps of:

retrieving from said at least one electronic database the prepayment parameters of the financial contract;

monitoring and reporting by electronic, video, or print means changes in investments, interest rates, inflation rates, profits generated on assets identified to the financial instrument and other criteria and information parameters;

determining through computer processing means coupled with said at least one electronic database the effects of changes in interest rates and account balances on the economics of the financial contract and the appropriateness of prepaying the financial contract;

calculating a redemption value of assets set aside to assure payment of minimum contract obligations, and the minimum requirement for contract repayment prior to maturity;

determining by computer processing means the cost to defease or repay contract liability based on the present value of assets identified to the contract, data concerning investment yields, other costs, and the time period to said payment date, which may include any minimum prepayment amounts; and determining from said at least one electronic database that the prepayment date is within periodic dates on which the issuing entity can elect to partially or wholly prepay the financial contract.

103. A financial contract produced by the practice of the method of claim 102.

104. The method of claim 98, comprising maintaining by memory means one or more financial accounts in said at least one electronic database;

utilizing one or more data processing computers in cooperation with said accounts comprising the steps of:

communicating with said accounts;

interacting with said accounts maintained by memory means;

determining by computer processing means that periodic computation, period ending, payment, and maturity dates have occurred or will occur within a preset number of days;

establishing by computer processing means the balance at the end of the previous period(s) of the accounts used for the purpose of allocating the financial results of the issuing entity's business activities identified to the financial contract(s) and periodically determining its obligations to contractholder(s) and service providers;

determining and storing by memory means the periodic external benchmark to be used to reset periodic compensation of the financial contract, the rate parameters for the period, and the conditions under which the issuing entity could reduce the periodic compensation of the financial contract to a level less than an amount determined by applying the external benchmark;

processing and storing in said at least one electronic database the inputs to the accounts for the current period(s) prior to calculation of periodic compensation;

determining and recalculating by computer processing means the periodic compensation rate;

updating the inputs to the accounts for the current period(s) after calculation of periodic compensation;

determining by computer processing means payments to contractholder, intermediaries, and service providers;

allocating by electronic means transfer amounts between the accounts established at issuance of the financial contract; and determining by processing means and storing in said at least one electronic database the balance at the end of the current period(s) of the accounts used for the purpose of allocating the financial results of the issuing entity's business activities identified to the financial contract (s) and periodically determining its obligations to contractholder(s) and service providers.

105. The method of claim 104, further comprises the steps of:

determining from said at least one electronic database that allocation of amounts identified to the financial contract are being used by the issuing entity in the identified business activity (ies), consistent with the terms agreed, recorded and communicated at issuance of the financial contract(s); and periodically through computer processing means adjusting and updating a portfolio of securities and said asset position list.

106. The method of claim 104, further comprises the steps of:

recording, updating, and storing payment information, current rate information, compensation and paying information and other contract information and contractholder inquiries, which may be contained in one or more system databases;

generating electronically and/or in print form detail and summary data on account balances and the status of the issuing entity's assets and its contractual obligations to the contractholder; and recording, updating and storing the account list of current balance information for each financial contract, account information and the accounts into which said issuing means has issued a financial contract in said at least one electronic database.

107. The method of claim 104, comprising the steps of:

confirming individual transactions and responding to inquiries from customers by electronic, video display terminal telephone, or print means; and periodically generating and publishing a report by computer processing means including a summary of contracts issued, periodic compensation allocations, payments, asset and liability position, and investment performance.

108. The method of claim 104, further comprising the steps of:

retrieving the previous period ending balance of the balance, payment, and purpose accounts from said at least one electronic database prior to a given period;

calculating the external benchmark rate for the period and other rate levels, which may include the maximum rate for the period, the contract maximum rate, and a contract minimum rate;

determining by computer processing means as of the periodic computation date, after distribution of required payments to contractholder(s), the amount of contract proceeds and accrued compensation, if applicable, outstanding to contractholder(s) from issuing entity, such amount being the balance on the periodic computation date of the balance account; and calculating by computer means the amount of the periodic increase in assets allocated to purpose account(s) to be recognized as attributable to the computational account in the respective period.

109. The method of claim 104, comprising the steps of:

entering and storing in said at least one electronic database a beginning periodic computational balance;

retrieving by computer processing means the adjustment parameter data agreed at issuance of the financial contract; and calculating an adjusted periodic balance of the computational account to be used in determining periodic compensation.

110. The method of claim 104, further comprising the steps of:

determining the amount of assets allocated to the payment account when compounded to payment date(s) required under the financial contract using rates of compensation accruing on such instruments and determining if the amount is sufficient to meet all previously agreed terms of the financial contract; and determining, if such assets are insufficient, a percentage as it relates to the balance account of the amount necessary to eliminate such shortfall.

111. The method of claim 104, further comprising the steps of:

determining by computer means by dividing the adjusted periodic balance of the computational account by the balance on the periodic computation date of the balance account, added to the minimum rate, if such rate is funded with assets allocated to the payment account and such payment account is not insufficient on the date of the periodic computation, said result being the formula rate; and comparing through computer processing means the formula rate to the external benchmark, and other rates which may include a minimum rate, a contract maximum rate, and a maximum rate for the period.

112. The method of claim 104, further comprising the steps of:

determining by computer processing means the amount to be allocated to a computational account if the formula rate is less than the external benchmark to permit the issuing entity to establish the compensation crediting rate for the subsequent period at the external benchmark; and determining by computer processing means whether sufficient such amount is available for transfer from purpose accounts or from other assets or revenues of the issuing entity to the extent agreed at issuance of the financial contract, and if not, the amount otherwise available for such transfer.

113. The method of claim 104, further comprising the steps of:

determining through computer processing means the compensation crediting rate:

at the external benchmark if a formula rate is below the external benchmark and sufficient assets are available for allocation to the computational account;

at a level below the external benchmark if assets allocated to the computational account are not sufficient to establish such rate at the external benchmark, such lower rate being determined by computing the percentage at which such available assets would be sufficient to fund compensation for the subsequent period; and above the formula rate if such rate does not exceed any periodic maximum or contract maximum rate, and in the event the formula rate does exceed such maximum rates, establishing and storing in said at least one electronic database the compensation crediting rate for the subsequent period at the lower of such rates.

114. The method of claim 104, further comprising the steps of:

calculating by computer means the present value of the subsequent period compensation based on the newly established compensation crediting rate;

allocating such amount from a computational account to a payment account within said at least one electronic database; and allocating any remaining balance in the computational account to one or more purpose accounts or as otherwise as provided in the financial contract.

115. The method of claim 104, further comprising the steps of:

creating and reducing a payment account by any payments made to contractholder; and creating and increasing a balance account by the accrual of compensation based on the compensation crediting rate.

116. The method of claim 104, further comprising the steps of:

creating subaccounts within said at least one electronic database and periodically allocating a portion of amounts allocated to accounts to such subaccounts;

selecting through computer processing means and input means a portfolio of securities and updating said asset position list periodically, based on an amount of cash that is available for investment, current composition of the asset portfolio, projected cash need for the following period, projected compensation liability schedule, and predefined portfolio selection criteria, in order to generate a stream of cash flows from the asset portfolio that will be sufficient to cover in full in a timely manner the contract obligations;

recording the selected security purchase and sale transaction data to update the asset position list in said at least one electronic database; and sending by electronic, video or print means contractholders periodic payments, notices and status reports of their financial contracts.

117. A financial contract produced by the practice of the method of claim 104.

118. A method of creating, servicing and saying financial contracts and operating a plurality of financial accounts connected thereto having terms and conditions which provide repayment of monies tendered by one entity to another on a date or dates in the future, along with periodically provided compensation thereon, for the purpose of protecting the solvency of the issuing entity and providing reasonable compensation to contractholders, said method comprising the steps of:

inputting and storing the negotiated terms and conditions of a financial contract with an identified contractholder into at least one electronic database which terms and conditions provide for the level of compensation on the financial contract to be adjusted periodically to produce a rate of compensation tied to an external benchmark, allowing the issuing entity to establish a lower rate of compensation in any period in which its solvency or deteriorating credit quality, including with respect to the business activity to which the contract relates, is otherwise threatened in exchange for establishment of a higher rate of compensation during periods in which the results of a formula computation exceed certain pre-agreed levels;

issuing the financial contract with the agreed terms and conditions representing constraints comprising the agreed terms and conditions;

creating and maintaining one or more accounts in said at least one electronic database to which funds received on the issuance of the financial contract are allocated;

utilizing one or more computers to interact and update said accounts maintained in said memory means and resort the data contained therein;

periodically updating said at least one electronic database including rebalancing by computer processing means financial accounts coupled to the said financial contracts and stored in said at least one electronic database and periodically establishing a rate of compensation tied to an external bench-mark, being diminished during any period in which the issuing entity's solvency is threatened or credit quality, including with respect to the business activity to which the contract relates, is impaired and augmented during periods in which the results of a formula computation exceed certain pre-agreed levels; and periodically determining and displaying the status of a financial contract relative to termination pursuant to the agreed terms and conditions of the financial contract.

* * * * *